US011333957B2

(12) United States Patent
Yanagisawa

(10) Patent No.: US 11,333,957 B2
(45) Date of Patent: May 17, 2022

(54) PROJECTION SYSTEM AND PROJECTOR

(71) Applicant: SEIKO EPSON CORPORATION, Tokyo (JP)

(72) Inventor: Hirotaka Yanagisawa, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/155,171

(22) Filed: Jan. 22, 2021

(65) Prior Publication Data

US 2021/0232035 A1 Jul. 29, 2021

(30) Foreign Application Priority Data

Jan. 24, 2020 (JP) .............................. JP2020-009802

(51) Int. Cl.
*G03B 21/14* (2006.01)
*G02B 13/16* (2006.01)
*G03B 21/28* (2006.01)
*G02B 17/08* (2006.01)

(52) U.S. Cl.
CPC ........... *G03B 21/142* (2013.01); *G02B 13/16* (2013.01); *G02B 17/0856* (2013.01); *G03B 21/28* (2013.01)

(58) Field of Classification Search
CPC ...... G03B 21/28; G03B 21/142; G02B 13/16; G02B 17/0856
See application file for complete search history.

(56) References Cited

U.S. PATENT DOCUMENTS

| 7,048,388 | B2 | 5/2006 | Takaura et al. |
| 7,549,755 | B2 | 6/2009 | Suzuki |
| 9,372,388 | B2 | 6/2016 | Matsuo |
| 2004/0156117 | A1 | 8/2004 | Takaura et al. |
| 2006/0193036 | A1 | 8/2006 | Suzuki |
| 2010/0214664 | A1* | 8/2010 | Chia ................... G02B 13/004 359/677 |
| 2012/0147338 | A1* | 6/2012 | Huang .................. G02B 13/08 353/81 |
| 2012/0154768 | A1* | 6/2012 | Tatsuno .............. G03B 21/147 353/98 |

(Continued)

FOREIGN PATENT DOCUMENTS

| JP | 2004-246042 A | 9/2004 |
| JP | 2006-235516 A | 9/2006 |

(Continued)

*Primary Examiner* — Bao-Luan Q Le
(74) *Attorney, Agent, or Firm* — Oliff PLC

(57) ABSTRACT

A projection system includes a first optical system, a second optical system including a first optical element and a second optical element and disposed on the enlargement side of the first optical system, and a placement mechanism configured to selectively place one of the first and second optical elements on a first optical axis of the first optical system. The first optical element has a first light incident surface, a first reflection surface disposed on the enlargement side of the first light incident surface, and a first light exiting surface disposed on the enlargement side of the first reflection surface. The second optical element has a second light incident surface, a second reflection surface disposed on the enlargement side of the second light incident surface, and a second light exiting surface disposed on the enlargement side of the second reflection surface.

21 Claims, 28 Drawing Sheets

(56) References Cited

U.S. PATENT DOCUMENTS

| | | | | |
|---|---|---|---|---|
| 2012/0320347 A1* | 12/2012 | Morikuni | ............... | G02B 13/16 |
| | | | | 353/101 |
| 2012/0327372 A1* | 12/2012 | Otani | .................... | G02B 13/16 |
| | | | | 353/31 |
| 2013/0010370 A1* | 1/2013 | Otani | .................... | G02B 13/12 |
| | | | | 359/668 |
| 2013/0010371 A1* | 1/2013 | Otani | .................... | G02B 13/16 |
| | | | | 359/668 |
| 2013/0027676 A1* | 1/2013 | Otani | .................. | G03B 21/142 |
| | | | | 353/97 |
| 2013/0107229 A1* | 5/2013 | Otani | .................. | G03B 21/147 |
| | | | | 353/70 |
| 2014/0204351 A1 | 7/2014 | Matsuo | | |
| 2019/0011684 A1 | 1/2019 | Ishihara et al. | | |
| 2021/0033829 A1* | 2/2021 | Ishigame | ............... | G02B 13/18 |

FOREIGN PATENT DOCUMENTS

| | | | |
|---|---|---|---|
| JP | 2007-316674 | A | 12/2007 |
| JP | 2010-020344 | A | 1/2010 |
| JP | 2013-015853 | A | 1/2013 |
| JP | 2017-156712 | A | 9/2017 |
| JP | 2017-156713 | A | 9/2017 |
| JP | 2017-156714 | A | 9/2017 |
| JP | 2019-133061 | A | 8/2019 |
| JP | 2020-042103 | A | 3/2020 |
| JP | 2020-194115 | A | 12/2020 |

\* cited by examiner

PROJECTION SYSTEM AND PROJECTOR

The present application is based on, and claims priority from JP Application Serial Number 2020-009802, filed Jan. 24, 2020, the disclosure of which is hereby incorporated by reference herein in its entirety.

BACKGROUND

1. Technical Field

The present disclosure relates to a projection system and a projector.

2. Related Art

JP-A-2010-20344 describes a projector that enlarges and projects a projection image formed by an image formation section via a projection system. The projection system described in JP-A-2010-20344 is formed of a first optical system and a second optical system sequentially arranged from the reduction side toward the enlargement side. The first optical system includes a refractive optical system. The second optical system is formed of a reflection mirror having a concave reflection surface. The image formation section includes a light source and a light valve. The image formation section forms a projection image in the reduction-side image formation plane of the projection system. The projection system forms an intermediate image in a position between the first optical system and the reflection surface and projects a final image on a screen disposed in the enlargement-side image formation plane of the projection system.

Next, the projection system and the projector are required to have a shorter projection distance. Changing the projection specifications by using the projection system described in JP-A-2010-20344, however, undesirably incurs a cost because the changing is not facilitated.

SUMMARY

To solve the problem described above, a projection system according to an aspect of the present disclosure includes a first optical system, a second optical system including a first optical element and a second optical element and disposed on an enlargement side of the first optical system, and a placement mechanism configured to selectively place one of the first and second optical elements on a first optical axis of the first optical system. The first optical element has a first light incident surface, a first reflection surface disposed on the enlargement side of the first light incident surface, and a first light exiting surface disposed on the enlargement side of the first reflection surface. The second optical element has a second light incident surface, a second reflection surface disposed on the enlargement side of the second light incident surface, and a second light exiting surface disposed on the enlargement side of the second reflection surface.

A projector according to another aspect of the present disclosure includes the projection system described above and an image formation section that forms a projection image in a reduction-side image formation plane of the projection system.

DESCRIPTION OF EXEMPLARY EMBODIMENTS

A projection system according to an embodiment of the present disclosure and a projector including the projection system will be described below in detail with reference to the drawings.

Projector

Figure 1:
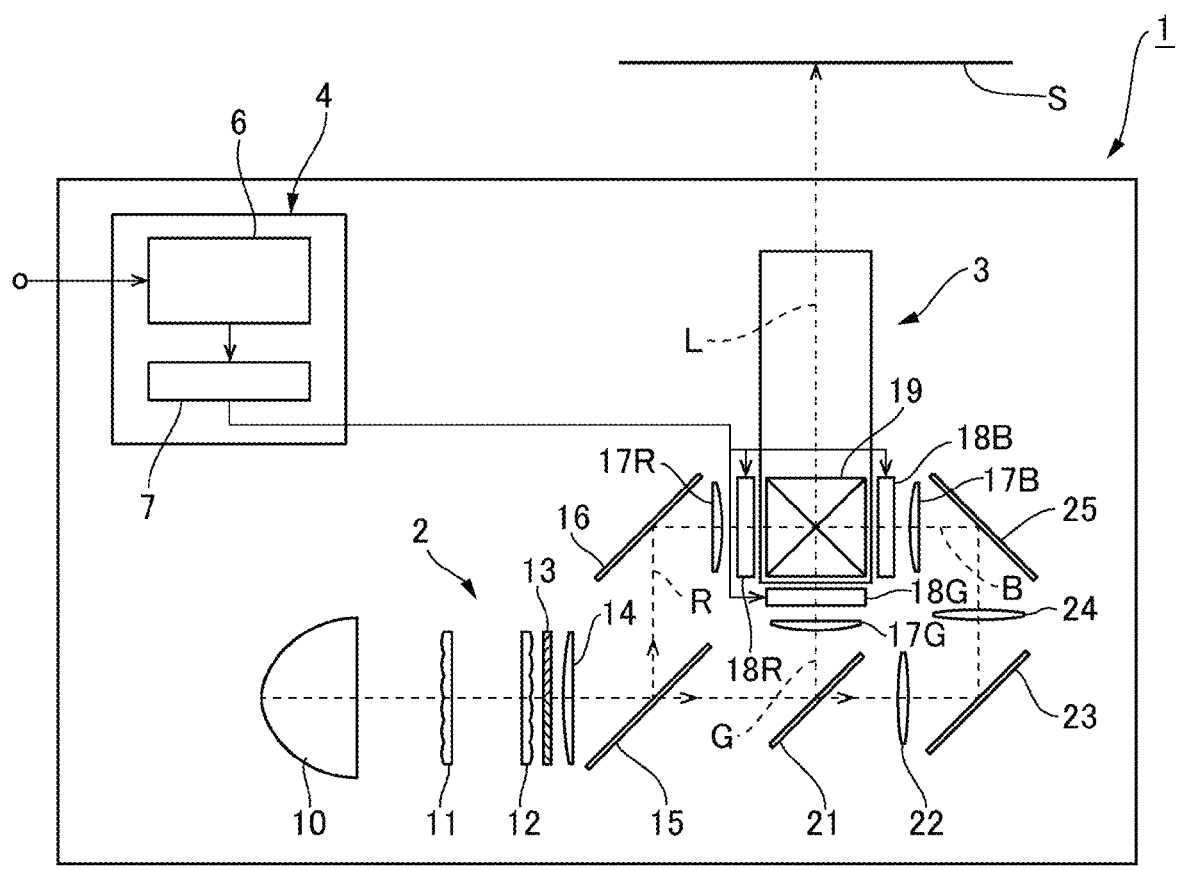
FIG. 1 is a schematic configuration diagram of a projector including a projection system.

FIG. 1 is a schematic configuration diagram of a projector including a projection system 3 according to the present disclosure. A projector 1 includes an image formation section 2, which generates a projection image to be projected on a screen S, the projection system 3, which enlarges the projection image and projects the enlarged image on the screen S, and a controller 4, which controls the action of the image formation section 2, as shown in FIG. 1.

Image Generation Optical System and Controller

The image formation section 2 includes a light source 10, a first optical integration lens 11, a second optical integration lens 12, a polarization converter 13, and a superimposing lens 14. The light source 10 is formed, for example, of an ultrahigh-pressure mercury lamp or a solid-state light source. The first optical integration lens 11 and the second optical integration lens 12 each include a plurality of lens elements arranged in an array. The first optical integration lens 11 divides the light flux from the light source 10 into a plurality of light fluxes. The lens elements of the first optical integration lens 11 focus the light flux from the light source 10 in the vicinity of the lens elements of the second optical integration lens 12.

The polarization converter 13 converts the light via the second optical integration lens 12 into predetermined linearly polarized light. The superimposing lens 14 superimposes images of the lens elements of the first optical integration lens 11 on one another in a display region of each of liquid crystal panels 18R, 18G, and 18B, which will be described later, via the second optical integration lens 12.

The image formation section 2 further includes a first dichroic mirror 15, a reflection mirror 16, a field lens 17R, and the liquid crystal panel 18R. The first dichroic mirror 15 reflects R light, which is part of the light rays incident via the superimposing lens 14, and transmits G light and B light, which are part of the light rays incident via the superimposing lens 14. The R light reflected off the first dichroic mirror 15 travels via the reflection mirror 16 and the field lens 17R and is incident on the liquid crystal panel 18R. The liquid crystal panel 18R is a light modulator. The liquid crystal panel 18R modulates the R light in accordance with an image signal to form a red projection image.

The image formation section 2 further includes a second dichroic mirror 21, a field lens 17G, and the liquid crystal panel 18G. The second dichroic mirror 21 reflects the G light, which is part of the light rays via the first dichroic mirror 15, and transmits the B light, which is part of the light rays via the first dichroic mirror 15. The G light reflected off the second dichroic mirror 21 passes through the field lens 17G and is incident on the liquid crystal panel 18G. The liquid crystal panel 18G is a light modulator. The liquid crystal panel 18G modulates the G light in accordance with an image signal to form a green projection image.

The image formation section 2 further includes a relay lens 22, a reflection mirror 23, a relay lens 24, a reflection mirror 25, a field lens 17B, and the liquid crystal panel 18B. The B light having passed through the second dichroic mirror 21 travels via the relay lens 22, the reflection mirror 23, the relay lens 24, the reflection mirror 25, and the field lens 17B and is incident on the liquid crystal panel 18B. The liquid crystal panel 18B is a light modulator. The liquid crystal panel 18B modulates the B light in accordance with an image signal to form a blue projection image.

The liquid crystal panels 18R, 18G, and 18B surround a cross dichroic prism 19 in such a way that the liquid crystal panels 18R, 18G, and 18B face three sides of the cross dichroic prism 19. The cross dichroic prism 19, which is a prism for light combination, produces a projection image that is the combination of the light modulated by the liquid crystal panel 18R, the light modulated by the liquid crystal panel 18G, and the light modulated by the liquid crystal panel 18B.

The cross dichroic prism 19 forms part of the projection system 3. The projection system 3 enlarges and projects the projection images (images formed by liquid crystal panels 18R, 18G, and 18B) combined by the cross dichroic prism 19 on the screen S. The screen S is the enlargement-side image formation plane of the projection system 3.

The controller 4 includes an image processor 6, to which an external image signal, such as a video signal, is inputted, and a display driver 7, which drives the liquid crystal panels 18R, 18G, and 18B based on image signals outputted from the image processor 6.

The image processor 6 converts the image signal inputted from an external apparatus into image signals each containing grayscales and other factors of the corresponding color. The display driver 7 operates the liquid crystal panels 18R, 18G, and 18B based on the color projection image signals outputted from the image processor 6. The image processor 6 thus causes the liquid crystal panels 18R, 18G, and 18B to display projection images corresponding to the image signals.

Projection System

Examples 1 to 3 will be described below as examples of the configuration of the projection system 3 incorporated in the projector 1. In Examples 1 to 3, the projection systems 3 each include a first optical system 31 and a second optical system 32 sequentially arranged from the reduction side toward the enlargement side. The projection systems 3 each include a first optical element 33 and a second optical element 34 as the second optical system 32 and further includes a placement mechanism 60, which can selectively place one of the first optical element 33 and the second optical element 34 as the second optical system 32. The first optical system 31 is commonly used both when the first optical element 33 is selected as the second optical system 32 and when the second optical element 34 is selected as the second optical system 32. That is, the single first optical system 31 is used in each of Examples.

Figure 2:
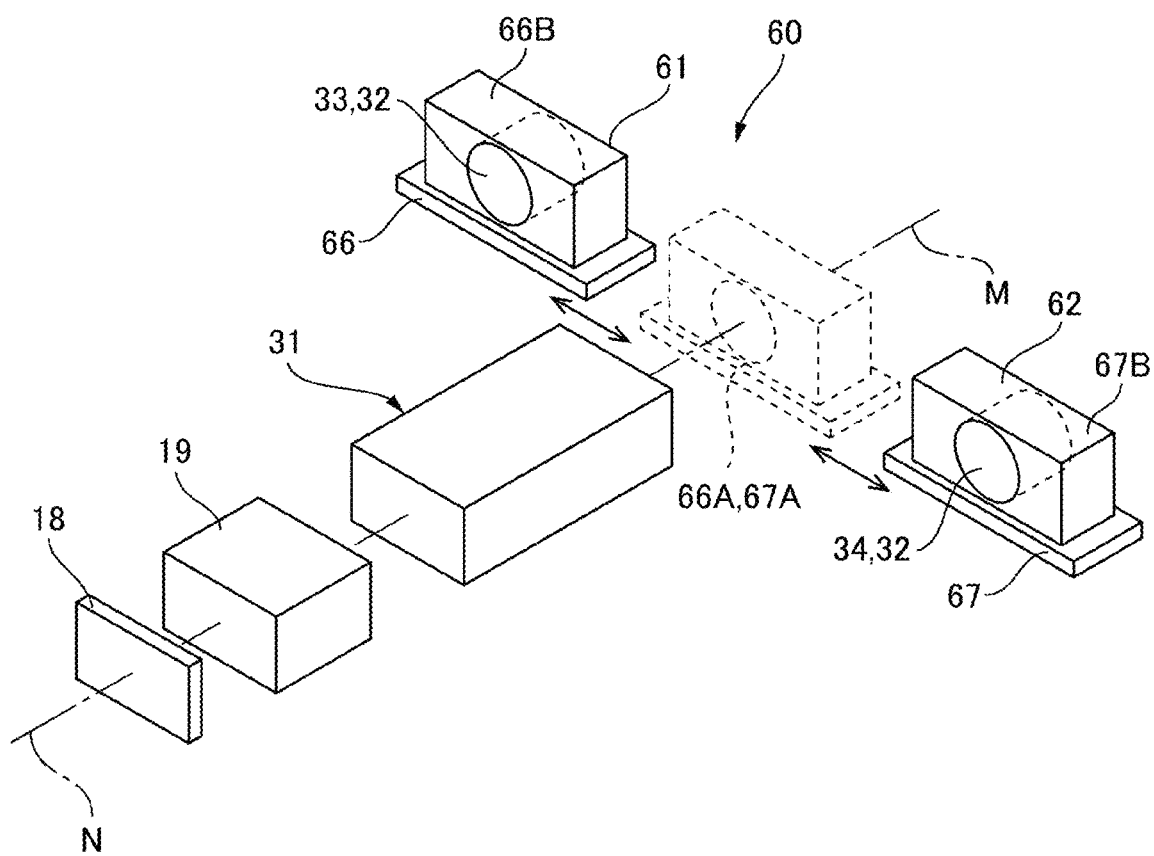
FIG. 2 describes a placement mechanism provided in the projection system.

FIG. 2 describes the placement mechanism 60. The placement mechanism 60 selectively places one of the first optical element 33 and the second optical element 34 on a first optical axis N of the first optical system 31. The placement mechanism 60 can be formed, for example, of a first holding member 61, which holds the first optical element 33, a second holding member 62, which holds the second optical element 34, and a first movement mechanism 66 for moving the first holding member 61 and a second movement mechanism 67 for moving the second holding member 62. The first movement mechanism 66 moves the first holding member 61 to one of a first selected position 66A, where the first optical element 33 is located on the first optical axis N of the first optical system 31, and a first retracted position 66B, where the first optical element 33 is separate from the first optical axis N of the first optical system 31. The second movement mechanism 67 moves the second holding member 62 to one of a second selected position 67A, where the second optical element 34 is located on the first optical axis N of the first optical system 31, and a second retracted position 67B, where the second optical element 34 is separate from the first optical axis N of the first optical system 31. The first selected position 66A and the second selected position 67A differ from each other in some cases in terms of the position along the direction of the first optical axis of the first optical system 31. When the first holding member 61 is located in the first selected position 66A, the second holding member 62 is located in the second retracted position 67B. When the second holding member 62 is located in the second selected position 67A, the first holding member 61 is located in the first retracted position 66B. The first movement mechanism 66 and the second movement mechanism 67 operate in cooperation with each other.

In the description of the projection systems according to Examples 1 to 3, a first form in which the first optical element 33 is selected as the second optical system 32 and a second form in which the second optical element 34 is selected as the second optical system 32 are shown in parallel. Further, in the light ray diagrams of the projection systems according to Examples 1 to 3, the liquid crystal panels 18R, 18G, and 18B are referred to as liquid crystal panels 18.

Example 1

Figure 3:
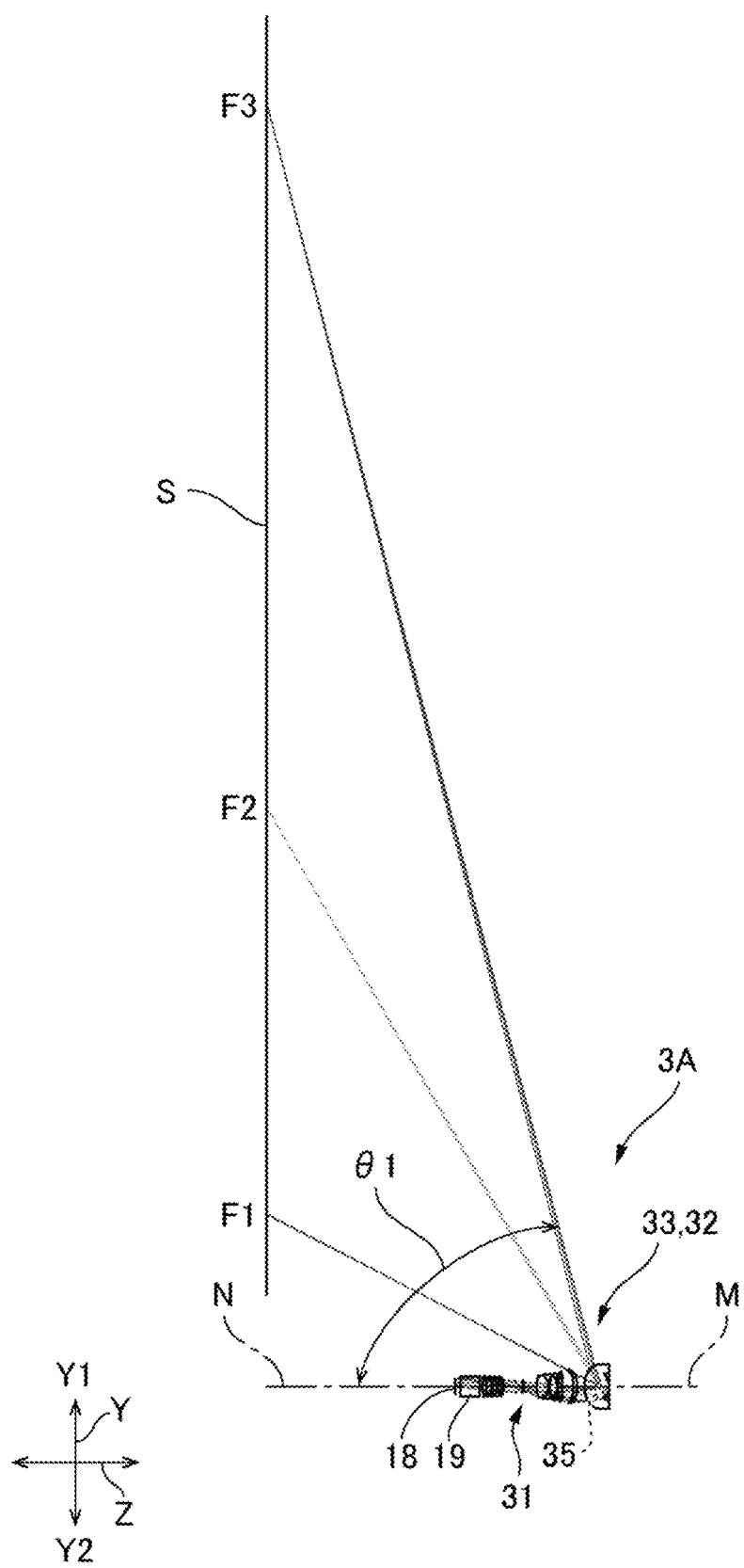
FIG. 3 is a light ray diagram diagrammatically showing the entire projection system in a first form according to Example 1.
Figure 4:
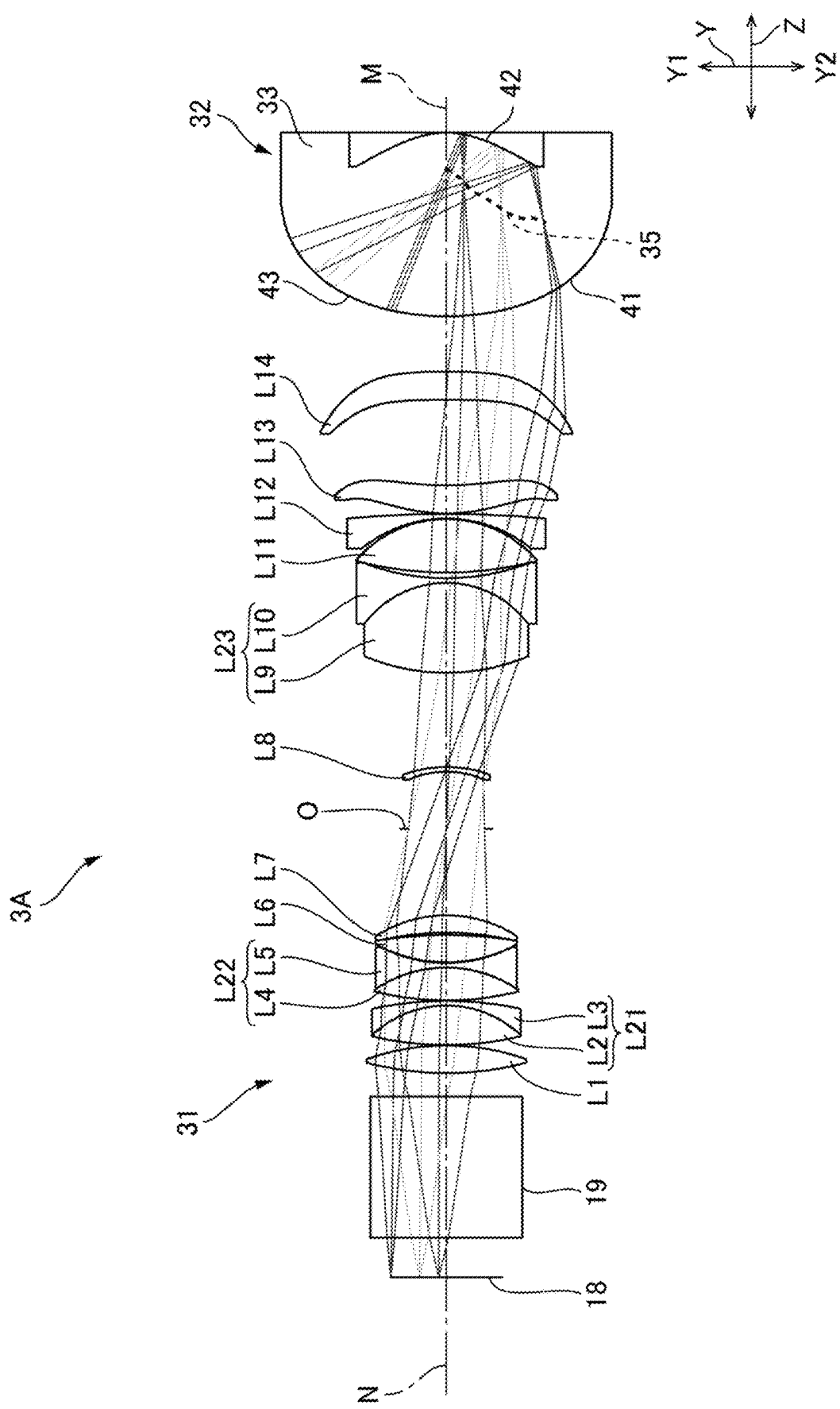
FIG. 4 is a light ray diagram of the first form of the projection system according to Example 1.
Figure 5:
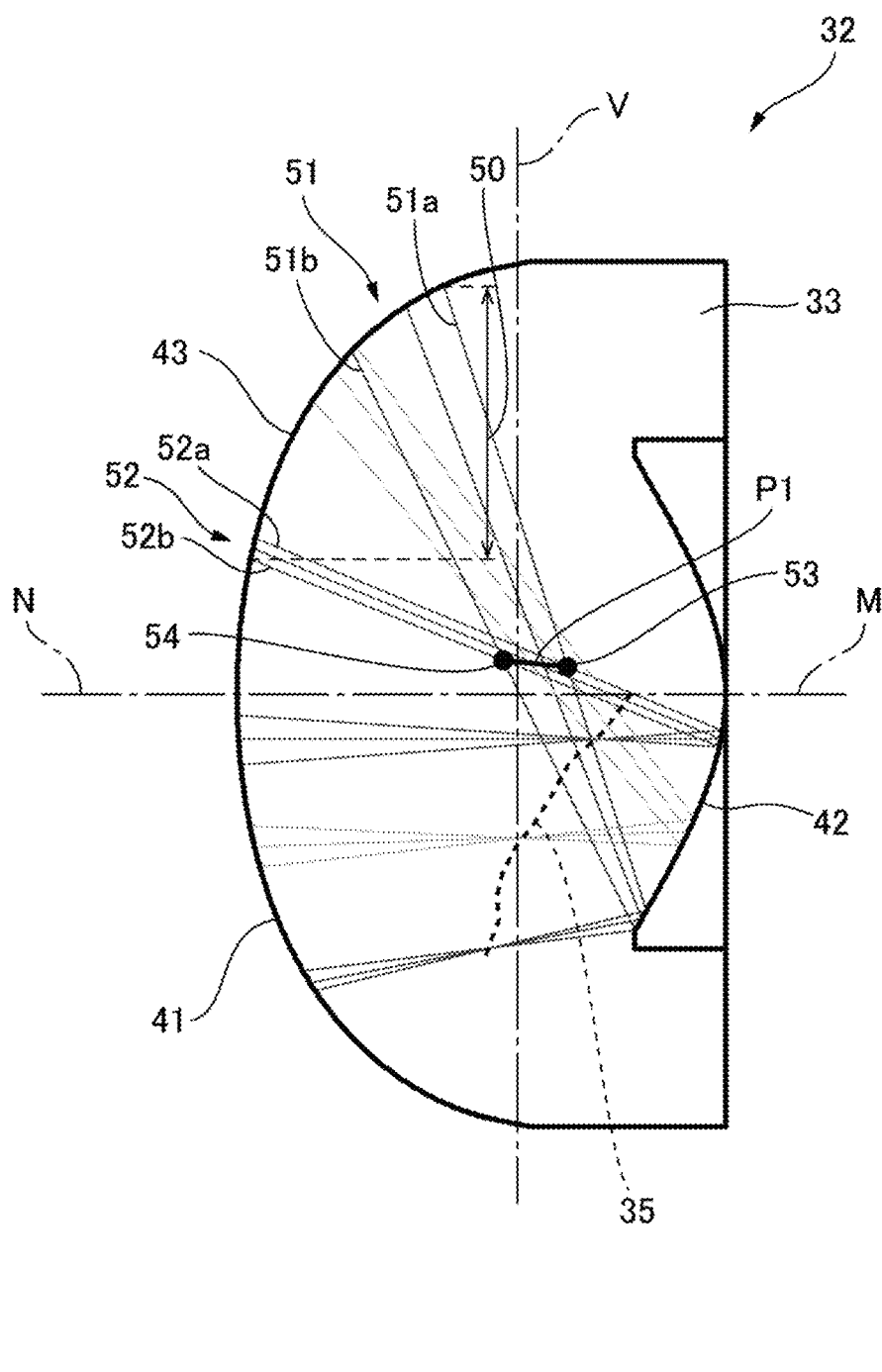
FIG. 5 is a light ray diagram of a second optical system in the first form of the projection system according to Example 1.
Figure 6:
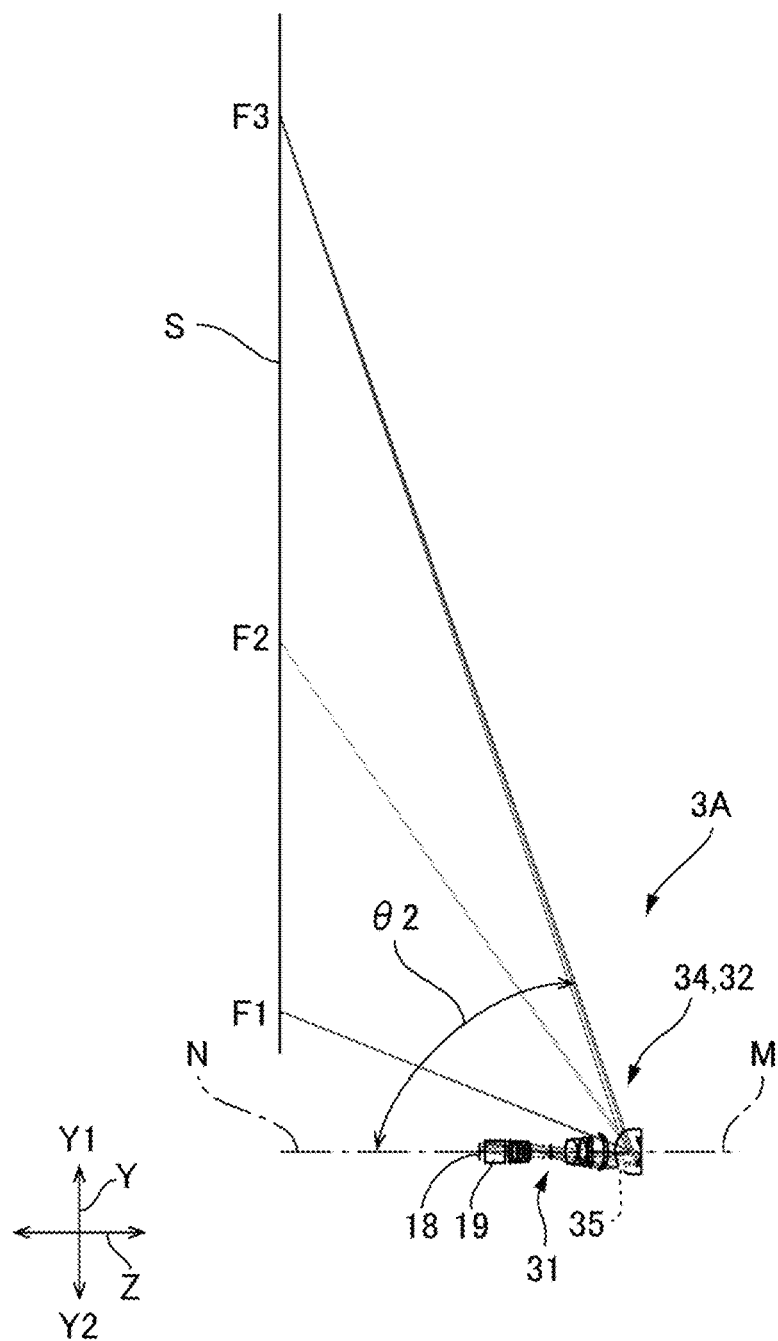
FIG. 6 is a light ray diagram diagrammatically showing the entire projection system in a second form according to Example 1.
Figure 7:
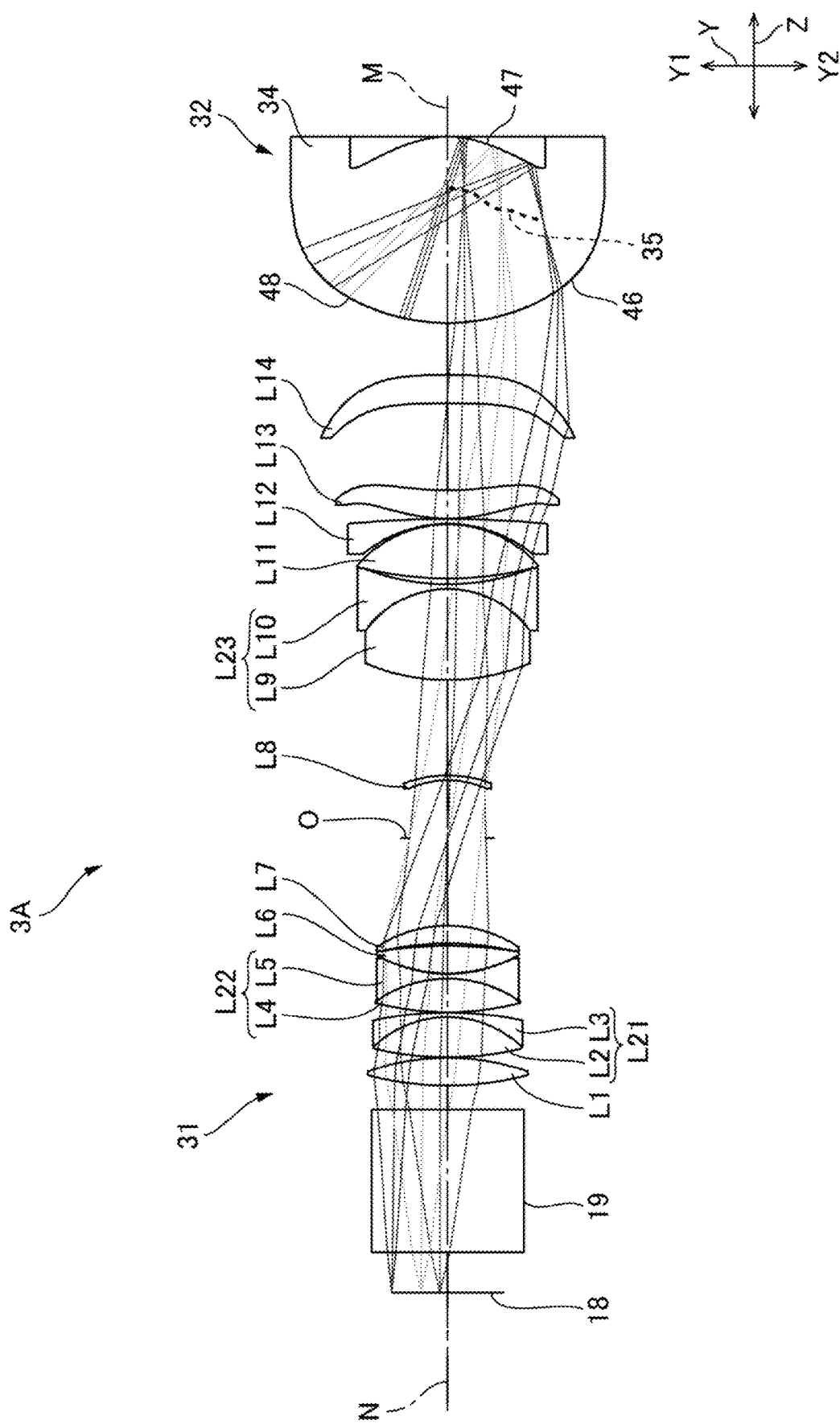
FIG. 7 is a light ray diagram of the second form of the projection system according to Example 1.
Figure 8:
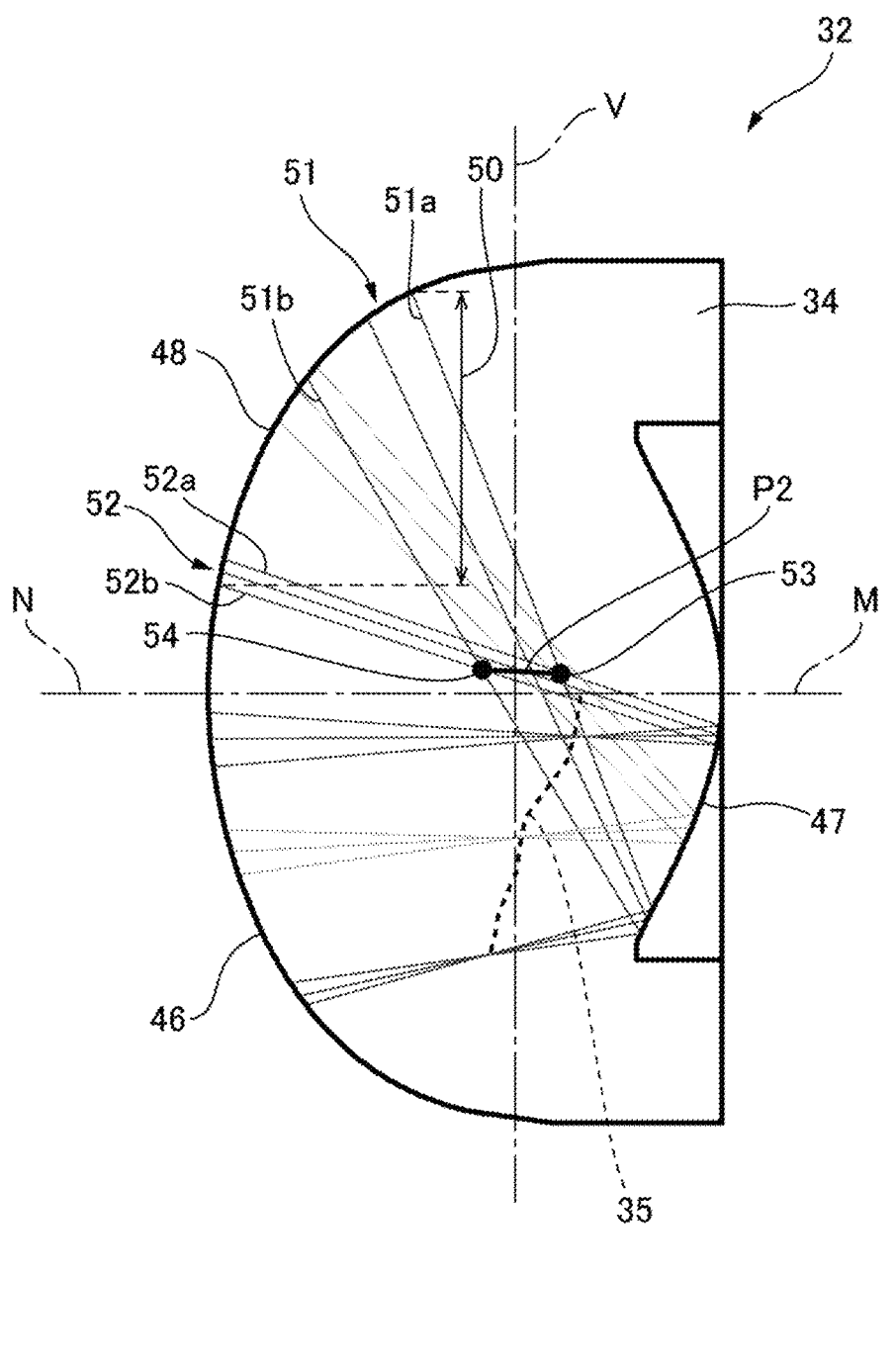
FIG. 8 is a light ray diagram of the second optical system in the second form of the projection system according to Example 1.

FIG. 3 is a light ray diagram diagrammatically showing the entirety of a projection system 3A in the first formed according to Example 1. FIG. 4 is a light ray diagram of the first form of the projection system 3A according to Example 1. FIG. 5 is a light ray diagram of a second optical system in the first form of the projection system 3A according to Example 1. FIG. 6 is a light ray diagram diagrammatically showing the entirety of the projection system 3A in the second formed according to Example 1. FIG. 7 is a light ray diagram of the projection system 3A in the second form according to Example 1. FIG. 8 is a light ray diagram of the second optical system in the second form of the projection system 3A according to Example 1.

The projection system 3A in the first form can perform wide-angle projection, as shown in FIG. 3. That is, a first projection angle θ1, which is the projection angle over which the projection system 3A in the first form projects a final image on the screen S, is relatively large. FIGS. 3 and 6 diagrammatically show light fluxes F1 to F3, which exit out of the projection system 3A according to the present example and reach the screen S. The light flux F1 is a light flux that reaches a smallest image height position. The light flux F3 is a light flux that reaches a largest image height position. The light flux F2 is a light flux that reaches a position between the position that the light flux F1 reaches and the position that the light flux F3 reaches. The projection angle used herein is the angle between the first optical axis N of the first optical system 31 and the outermost light ray of the light flux F3.

First Form of Example 1

The projection system 3A in the first form includes the first optical system 31 and the second optical system 32 sequentially arranged from the reduction side toward the enlargement side, as shown in FIG. 4. The first optical system 31 is a refractive optical system including a plurality of lenses. The second optical system 32 is formed of the first optical element 33. The first optical element 33 has a first light incident surface 41, a first reflection surface 42, and a first light exiting surface 43 sequentially arranged from the reduction side. The first light incident surface 41 has a convex shape protruding toward the reduction side. The first reflection surface 42 has a concave shape. The first light exiting surface 43 has a convex shape protruding toward the enlargement side. The first optical element 33, which forms the second optical system 32, is disposed on the first optical axis N1 of the first optical system 31. In the present example, the first optical axis N of the first optical system 31 coincides with a second optical axis M of the first reflection surface 42 of the first optical element 33.

The liquid crystal panels 18 of the image formation section 2 are disposed in the reduction-side image formation plane of the projection system 3A. The liquid crystal panels 18 form the projection images on one side of the first optical axis N of the first optical system 31 in a plane perpendicular to the first optical axis N. The screen S is disposed in the enlargement-side image formation plane of the projection system 3A. An intermediate image 35 conjugate with the reduction-side image formation plane is formed between the first optical system 31 and the first reflection surface 42 of the first optical element 33. The intermediate image 35 is conjugate also with the enlargement-side image formation plane. In the present example, the intermediate image 35 is formed inside the first optical element 33. That is, the intermediate image 35 is formed between the first light incident surface 41 and the first reflection surface 42 of the first optical element 33.

In the following description, three axes perpendicular to one another are called axes X, Y (first axis), and Z for convenience. The width direction of the screen S, which is the enlargement-side image formation plane, is called an axis-X direction, the upward/downward direction of the screen S is called an axis-Y direction, and the direction perpendicular to the screen S is called an axis-Z direction. The plane containing the first optical axis N of the first optical system 31 and the second optical axis M of the first reflection surface 42 of the first optical element is called a plane YZ.

In the present example, the first optical axis N of the first optical system 31 and the second optical axis M of the first reflection surface 42 of the first optical element 33 extend in the axis-Z direction. FIGS. 3, 4, and 5 are each a light ray diagram in the plane YZ. The liquid crystal panels 18 form the projection images on an upper side Y1 of the first optical axis N of the first optical system 31.

The first optical system 31 includes the cross dichroic prism 19 and 14 lenses L1 to L14, as shown in FIG. 4. The lenses L1 to L14 are arranged in the presented order from the reduction side toward the enlargement side. In the present example, the lenses L2 and L3 are bonded to each other into a first doublet L21. The lenses L4 and L5 are bonded to each other into a second doublet L22. The lenses L9 and L10 are bonded to each other into a third doublet L23. An aperture O is disposed between the lens L7 and the lens L8.

The first optical element 33 is designed by using the second optical axis M of the first reflection surface 42 as the axis in the design stage, as shown in FIG. 5. In other words, the second optical axis M is the design-stage optical axis of the first light incident surface 41, the first light exiting surface 43, and the first reflection surface 42. The first light incident surface 41 and the first reflection surface 42 are located on a lower side Y2 of the second optical axis M of the first reflection surface 42, and the first light exiting surface 43 is located on the upper side Y1 of the second optical axis M of the first reflection surface 42. In the present example, the first light incident surface 41, the first reflection surface 42, and the first light exiting surface 43 of the first optical element 33 each have a shape rotationally symmetric around the second optical axis M of the first reflection surface 42 as the axis of rotation. The first light incident surface 41 and the first light exiting surface 43 therefore form a rotationally symmetric shape. The first light incident surface 41, the first reflection surface 42, and the first light exiting surface 43 of the first optical element 33 are each an aspheric surface. The first reflection surface 42 is a reflection coating layer provided on the surface of the first optical element 33 that is the surface opposite the first light incident surface 41. The aspheric surfaces are each a free-form surface in some cases. Also in this case, the free-form surfaces are designed by using the second optical axis M as the design-stage axis.

A first pupil P1 of the second optical system 32 is located inside the first optical element 33, as shown in FIG. 5. The first pupil P1 of the second optical system 32 in the plane YZ is defined by the line that connects an upper intersection 53, where an upper peripheral light ray 51a of an upper end light flux 51 passing through the axis-Y-direction upper end of an effective light ray range 50 of the first light exiting surface 43 and an upper peripheral light ray 52a of a lower end light flux 52 passing through the axis-Y-direction lower end of the effective light ray range 50 intersect each other in the plane YZ, to a lower intersection 54, where a lower peripheral light ray 51b of the upper end light flux 51 and a lower peripheral light ray 52b of the lower end light flux 52 intersect each other in the plane YZ. The first pupil P1 inclines with respect to an imaginary vertical line V perpendicular to the second optical axis M of the first reflection surface 42 in the plane YZ.

Lens Data

Data on the lenses of the projection system 3A are listed below. The surfaces of the lenses are numbered sequentially from the reduction side toward the enlargement side. Reference characters are given to the lenses, the first light incident surface, the first reflection surface, and the first light exiting surface. Data labeled with a surface number that does not correspond to any of the lenses, the first light incident surface, the first reflection surface, and the first light exiting surface is dummy data. Reference character R denotes the radius of curvature. Reference character D denotes the axial inter-surface distance. Reference character C denotes the aperture radius. Reference characters R, D, and C are each expressed in millimeters.

| Reference character | Surface number | Shape | R | D | Glass material | Refraction/reflection | C |
|---|---|---|---|---|---|---|---|
| 18 | 0 | Spherical | Infinity | 8.4859 | | Refraction | 0.0000 |
| 19 | 1 | Spherical | Infinity | 30.1506 | SBSL7_OHARA | Refraction | 12.6334 |
| | 2 | Spherical | Infinity | 5.0143 | | Refraction | 14.8167 |
| | 3 | Spherical | Infinity | 0.0000 | | Refraction | 15.3698 |
| | 4 | Spherical | Infinity | 0.0000 | | Refraction | 15.3698 |
| | 5 | Spherical | Infinity | 0.0000 | | Refraction | 15.3698 |
| L1 | 6 | Spherical | 65.3371 | 5.8874 | 497451.7695 | Refraction | 15.5777 |
| | 7 | Spherical | −49.6319 | 0.1000 | | Refraction | 15.5634 |
| L2 | 8 | Spherical | 66.3089 | 8.4225 | 489067.6221 | Refraction | 14.7615 |
| L3 | 9 | Spherical | −22.5098 | 1.0000 | 834805.4272 | Refraction | 14.4598 |
| | 10 | Spherical | −72.9598 | 0.1000 | | Refraction | 14.5180 |
| L4 | 11 | Spherical | 61.0285 | 7.0224 | 466237.7988 | Refraction | 14.0323 |
| L5 | 12 | Spherical | −26.3124 | 1.0000 | 840873.3029 | Refraction | 13.7644 |
| | 13 | Spherical | 29.8875 | 0.1216 | | Refraction | 13.7143 |
| L6 | 14 | Spherical | 30.5660 | 5.8252 | 827375.2424 | Refraction | 13.7450 |
| | 15 | Spherical | −89.6876 | 0.4982 | | Refraction | 13.7512 |
| L7 | 16 | Spherical | −61.5318 | 3.7335 | 512482.7396 | Refraction | 13.7509 |
| | 17 | Spherical | −26.8299 | 18.5003 | | Refraction | 13.5002 |
| O | aperture | Spherical | Infinity | 12.1803 | | Refraction | 8.0653 |
| L8 | 19 | Spherical | −19.3204 | 1.0000 | 437001.951 | Refraction | 8.0001 |
| | 20 | Spherical | −26.1014 | 20.1363 | | Refraction | 8.3250 |
| L9 | 21 | Spherical | 43.9622 | 19.2102 | 655112.3105 | Refraction | 15.8061 |
| L10 | 22 | Spherical | −21.3739 | 1.0000 | 846663.2378 | Refraction | 16.0445 |
| | 23 | Spherical | 48.4377 | 1.2197 | | Refraction | 17.6763 |
| L11 | 24 | Spherical | 74.6611 | 11.4179 | 667614.3028 | Refraction | 17.6787 |
| | 25 | Spherical | −24.9813 | 0.1000 | | Refraction | 18.1297 |
| L12 | 26 | Spherical | −28.0717 | 1.0000 | 776762.4909 | Refraction | 17.8804 |
| | 27 | Spherical | −218.8664 | 0.1000 | | Refraction | 19.5619 |
| L13 | 28 | Aspheric | 35.5372 | 6.0001 | E48R_ZEON | Refraction | 21.0899 |
| | 29 | Aspheric | 62.2622 | 18.2764 | | Refraction | 21.9723 |
| L14 | 30 | Aspheric | −260.9712 | 6.0001 | E48R_ZEON | Refraction | 24.5560 |
| | 31 | Aspheric | −242.0358 | 11.8538 | | Refraction | 25.5340 |
| | 32 | Spherical | Infinity | 0.0000 | | Refraction | 24.3112 |
| 41 | 33 | Aspheric | 56.3202 | 39.2342 | Z330R_ZEON | Refraction | 23.9622 |
| | 34 | Spherical | Infinity | 0.0000 | Z330R_ZEON | Refraction | 18.3502 |
| 42 | 35 | Aspheric | −17.6860 | 0.0000 | Z330R_ZEON | Reflection | 19.1699 |
| | 36 | Spherical | Infinity | −39.2342 | Z330R_ZEON | Refraction | 37.2226 |
| 43 | 37 | Aspheric | 56.3202 | −110.0018 | | Refraction | 33.0898 |
| | 38 | Spherical | Infinity | −95.0015 | | Refraction | 513.9232 |
| | 39 | Spherical | Infinity | −301.0048 | | Refraction | 873.4344 |
| S | 40 | Spherical | Infinity | 0.0000 | | Refraction | 2012.5170 |

The aspheric coefficients of each of the aspheric surfaces are listed below.

| Surface number | S28 | S29 | S30 | S31 |
|---|---|---|---|---|
| Radius of curvature in axis-Y direction | 35.5372 | 62.2622 | −260.9712 | −242.0358 |
| Conic constant (k) | −0.133920864 | −8.315740849 | 90 | 0 |
| Fourth-order coefficient (A) | −1.01937E−05 | −6.03735E−06 | −1.01994E−05 | −2.82320E−05 |
| Sixth-order coefficient (B) | −8.03197E−09 | −2.41061E−08 | −2.81612E−08 | 1.83126E−08 |
| Eighth-order coefficient (C) | −3.19987E−11 | 5.87667E−13 | 3.19894E−11 | −1.52624E−11 |
| Tenth-order coefficient (D) | | | | |
| Twelfth-order coefficient (E) | | | | |

| Surface number | S33 | S35 | S37 |
|---|---|---|---|
| Radius of curvature in axis-Y direction | 56.3202 | −17.6860 | 56.3202 |
| Conic constant (k) | 1.649968721 | −3.245671782 | 1.649968721 |
| Fourth-order coefficient (A) | 4.94475E−07 | −4.92801E−06 | 4.94475E−07 |
| Sixth-order coefficient (B) | 2.03014E−09 | 1.05751E−08 | 2.03014E−09 |
| Eighth-order coefficient (C) | −1.01723E−12 | −8.36427E−12 | −1.01723E−12 |
| Tenth-order coefficient (D) | −9.62950E−16 | 1.90974E−14 | −9.62950E−16 |
| Twelfth-order coefficient (E) | 1.00490E−18 | | 1.00490E−18 |

A maximum object height, the F number, the projection angle, and TR of the projection system 3A in the first form are as follows: The maximum object height is the dimension from the first optical axis N of the projection system 3A in the first form to the farthest point therefrom in an image formation region of the surface of each of the liquid crystal panels 18. The maximum object height is expressed in millimeters. The F number is abbreviated to FNO. The projection angle is the first projection angle θ1 in degrees. TR stands for a throw ratio and is the quotient of the operation of dividing the projection distance by the axis-X-direction dimension of a projection image projected on the screen S.

| | |
|---|---|
| Maximum object height | 11.7 |
| FNO | 2.2 |
| Projection angle | 75.3 |
| TR (0.59" 16:9LV) | 0.230 |

Second Form of Example 1

A second projection angle θ2, which is the projection angle over which the projection system 3A in the second form projects the final image on the screen S, is smaller than the first projection angle θ1, over which the projection system 3A in the first form projects the final image on the screen S, as shown in FIGS. 3 and 6.

The projection system 3A in the second form is formed of the first optical system 31 and the second optical system 32 sequentially arranged from the reduction side toward the enlargement side, as shown in FIG. 7. The second optical system 32 is formed of the second optical element 34. The second optical element 34 has a second light incident surface 46, a second reflection surface 47, and a second light exiting surface 48 sequentially arranged from the reduction side. The second light incident surface 46 has a convex shape protruding toward the reduction side. The second reflection surface 47 has a concave shape. The second light exiting surface 48 has a convex shape protruding toward the enlargement side. The second optical element 34, which forms the second optical system 32, is disposed on the first optical axis N of the first optical system 31. In the present example, the first optical axis N of the first optical system 31 coincides with the second optical axis M of the second reflection surface 47. The first optical system 31 is the same as that of the projection system in the first form. The arrangement of the liquid crystal panels 18 is the same as that in the projection system in the first form.

The intermediate image 35 conjugate with the reduction-side image formation plane is formed between the first optical system 31 and the second reflection surface 47 of the second optical element 34. The intermediate image 35 is conjugate also with the enlargement-side image formation plane. The intermediate image 35 is formed inside the second optical element 34. That is, the intermediate image 35 is formed between the second light incident surface 46 and the second reflection surface 47 of the second optical element 34.

The second optical element 34 is designed by using the second optical axis M of the second reflection surface 47 as the axis in the design stage, as shown in FIG. 8. In other words, the second optical axis M is the design-stage optical axis of the second light incident surface 46, the second light exiting surface 48, and the second reflection surface 47. The second light incident surface 46 and the second reflection surface 47 are located on the lower side Y2 of the second optical axis M of the second reflection surface 47, and the second light exiting surface 48 is located on the upper side Y1 of the second optical axis M of the second reflection surface 47. In the present example, the second light incident surface 46, the second reflection surface 47, and the second light exiting surface 48 of the second optical element 34 each have a shape rotationally symmetric around the second optical axis M of the second reflection surface 47 as the axis of rotation. The second light incident surface 46 and the second light exiting surface 48 therefore form a rotationally symmetric shape. The second light incident surface 46, the second reflection surface 47, and the second light exiting surface 48 of the second optical element 34 are each an aspheric surface. The second reflection surface 47 is a reflection coating layer provided on a surface of the second optical element 34 that is the surface opposite the second light incident surface 46. The aspheric surfaces are each a free-form surface in some cases. Also in this case, the free-form surfaces are designed by using the second optical axis M as the design-stage axis.

Figure 9:
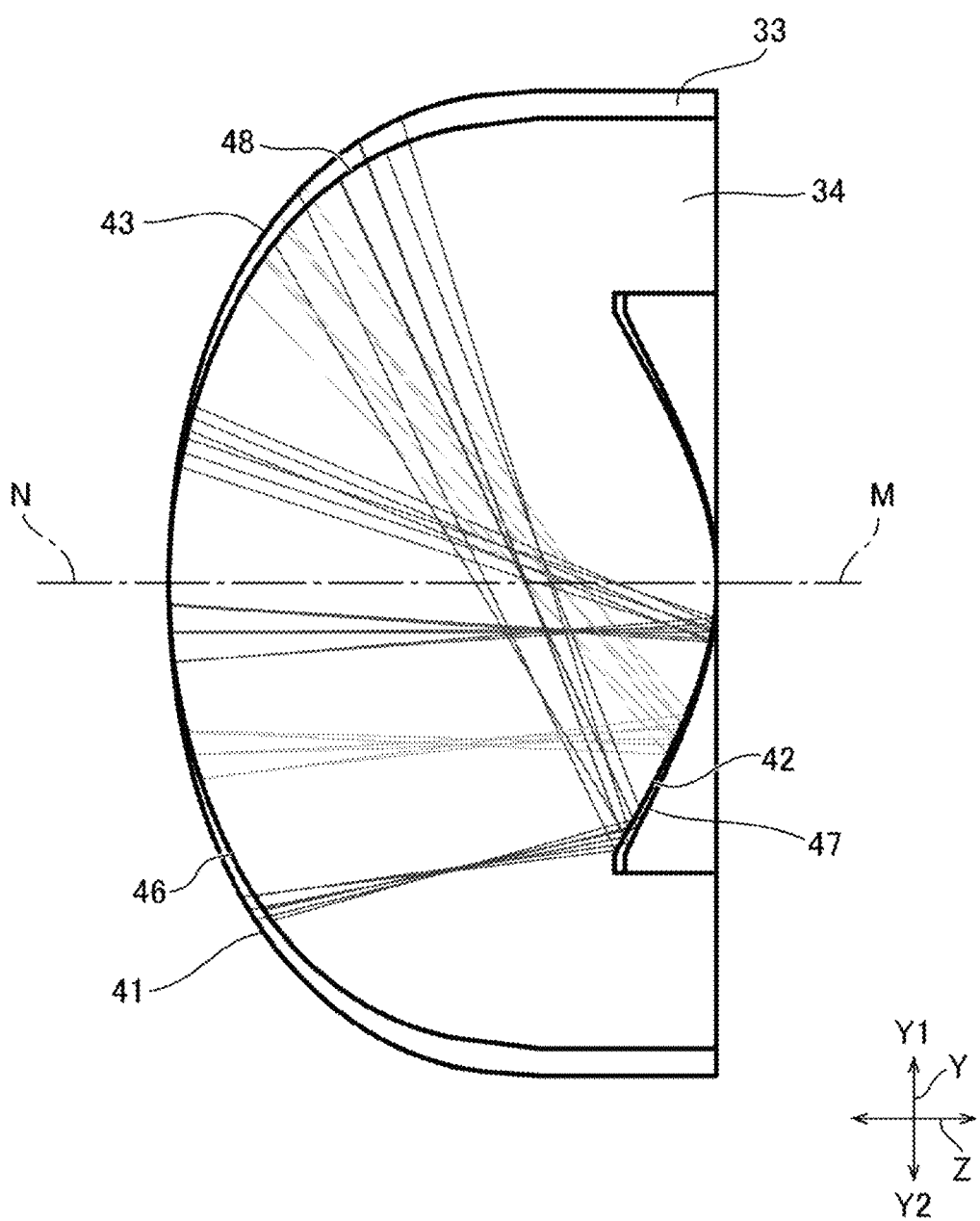
FIG. 9 describes the difference in shape between a first optical element and a second optical element in Example 1.

FIG. 9 describes the difference in shape between the first optical element 33 and the second optical element 34. FIG. 9 shows the first optical element 33 and the second optical element 34 superimposed on each other. The shapes of the first light incident surface 41, the first reflection surface 42, and the first light exiting surface 43 of the first optical element 33 differ from the shapes of the second light incident surface 46, the second reflection surface 47, and the second light exiting surface 48 of the second optical element 34, respectively, as shown in FIG. 9. That is, the aspheric shape of the second light incident surface 46 of the second optical element 34 differs from the aspheric shape of the first light incident surface 41 of the first optical element 33. The aspheric shape of the second reflection surface 47 of the second optical element 34 differs from the aspheric shape of the first reflection surface 42 of the first optical element 33. The aspheric shape of the second light exiting surface 48 of the second optical element 34 differs from the aspheric shape of the first light exiting surface 43 of the first optical element 33. Further, a first angle of incidence at which the chief ray of a first light flux reflected off the first reflection surface 42 is incident on the first light exiting surface 43 in the first optical element 33 is greater than a second angle of incidence at which the chief ray of a second light flux reflected off the second reflection surface 47 is incident on the second light exiting surface 48 in the second optical element 34.

A second pupil P2 of the second optical system 32 is located inside the second optical element 34, as shown in FIG. 8. The second pupil P2 of the second optical system 32 in the plane YZ is defined by the line that connects the upper intersection 53, where the upper peripheral light ray 51a of the upper end light flux 51 passing through the axis-Y-direction upper end of the effective light ray range 50 of the second light exiting surface 48 and the upper peripheral light ray 52a of the lower end light flux 52 passing through the axis-Y-direction lower end of the effective light ray range 50 intersect each other in the plane YZ, to the lower intersection 54, where the lower peripheral light ray 51b of the upper end light flux 51 and the lower peripheral light ray 52b of the lower end light flux 52 intersect each other in the plane YZ. The second pupil P2 inclines with respect to the imaginary vertical line V perpendicular to the second optical axis M of the second reflection surface 47 in the plane YZ.

Lens Data

In the projection system 3A in the second form, a second distance that is the axial inter-surface distance between the lens L14 of the first optical system 31 and the second optical element 34 differs from a first distance that is the axial inter-surface distance between the lens L14 of the first optical system 31 and the first optical element 33 in the projection system 3A in the first form. That is, in the projection system according to the present example, the placement mechanism 60 places the first optical element 33 and the second optical element 34 in different positions on the first optical axis N of the first optical system 31. Data on the lenses of the projection system 3A in the second form are listed below. The surfaces of the lenses are numbered sequentially from the reduction side toward the enlargement side. Reference characters are given to the lenses, the second light incident surface, the second reflection surface, and the second light exiting surface. Data labeled with a surface number that does not correspond to any of the lenses, the second light incident surface, the second reflection surface, and the second light exiting surface is dummy data. Reference character R denotes the radius of curvature. Reference character D denotes the axial inter-surface distance. Reference character C denotes the aperture radius. Reference characters R, D, and C are each expressed in millimeters.

| Reference character | Surface number | Shape | R | D | Glass material | Refraction/ reflection | C |
|---|---|---|---|---|---|---|---|
| 18 | 0 | Spherical | Infinity | 8.4859 | | Refraction | 0.0000 |
| 19 | 1 | Spherical | Infinity | 30.1506 | SBSL7_OHARA | Refraction | 12.6334 |
| | 2 | Spherical | Infinity | 5.0143 | | Refraction | 14.8167 |
| | 3 | Spherical | Infinity | 0.0000 | | Refraction | 15.3698 |
| | 4 | Spherical | Infinity | 0.0000 | | Refraction | 15.3698 |
| | 5 | Spherical | Infinity | 0.0000 | | Refraction | 15.3698 |
| L1 | 6 | Spherical | 65.3371 | 5.8874 | 497451.7695 | Refraction | 15.5777 |
| | 7 | Spherical | −49.6319 | 0.1000 | | Refraction | 15.5634 |
| L2 | 8 | Spherical | 66.3089 | 8.4225 | 489067.6221 | Refraction | 14.7615 |
| L3 | 9 | Spherical | −22.5098 | 1.0000 | 834805.4272 | Refraction | 14.4598 |
| | 10 | Spherical | −72.9598 | 0.1000 | | Refraction | 14.5180 |
| L4 | 11 | Spherical | 61.0285 | 7.0224 | 466237.7988 | Refraction | 14.0323 |
| L5 | 12 | Spherical | −26.3124 | 1.0000 | 840873.3029 | Refraction | 13.7644 |
| | 13 | Spherical | 29.8875 | 0.1216 | | Refraction | 13.7143 |
| L6 | 14 | Spherical | 30.5660 | 5.8252 | 827375.2424 | Refraction | 13.7450 |
| | 15 | Spherical | −89.6876 | 0.4982 | | Refraction | 13.7512 |
| L7 | 16 | Spherical | −61.5318 | 3.7335 | 512482.7396 | Refraction | 13.7509 |
| | 17 | Spherical | −26.8299 | 18.5003 | | Refraction | 13.5002 |
| O1 | aperture | Spherical | Infinity | 12.1803 | | Refraction | 8.0653 |
| L8 | 19 | Spherical | −19.3204 | 1.0000 | 437001.951 | Refraction | 8.0001 |
| | 20 | Spherical | −26.1014 | 20.1363 | | Refraction | 8.3250 |

-continued

| Reference character | Surface number | Shape | R | D | Glass material | Refraction/ reflection | C |
|---|---|---|---|---|---|---|---|
| L9 | 21 | Spherical | 43.9622 | 19.2102 | 655112.3105 | Refraction | 15.8061 |
| L10 | 22 | Spherical | −21.3739 | 1.0000 | 846663.2378 | Refraction | 16.0445 |
|  | 23 | Spherical | 48.4377 | 1.2197 |  | Refraction | 17.6763 |
| L11 | 24 | Spherical | 74.6611 | 11.4179 | 667614.3028 | Refraction | 17.6787 |
|  | 25 | Spherical | −24.9813 | 0.1000 |  | Refraction | 18.1297 |
| L12 | 26 | Spherical | −28.0717 | 1.0000 | 776762.4909 | Refraction | 17.8804 |
|  | 27 | Spherical | −218.8664 | 0.1000 |  | Refraction | 19.5619 |
| L13 | 28 | Aspheric | 35.5372 | 6.0001 | E48R_ZEON | Refraction | 21.0899 |
|  | 29 | Aspheric | 62.2622 | 18.2764 |  | Refraction | 21.9723 |
| L14 | 30 | Aspheric | −260.9712 | 6.0001 | E48R_ZEON | Refraction | 24.5560 |
|  | 31 | Aspheric | −242.0358 | 11.0000 |  | Refraction | 25.5340 |
|  | 32 | Spherical | Infinity | 0.0000 |  | Refraction | 24.3112 |
| 46 | 33 | Aspheric | 43.3299 | 39.2342 | Z330R_ZEON | Refraction | 23.9622 |
|  | 34 | Spherical | Infinity | 0.0000 | Z330R_ZEON | Refraction | 18.3502 |
| 47 | 35 | Aspheric | −20.7986 | 0.0000 | Z330R_ZEON | Reflection | 19.1699 |
|  | 36 | Spherical | Infinity | −39.2342 | Z330R_ZEON | Refraction | 37.2226 |
| 48 | 37 | Aspheric | 43.3299 | −110.0018 |  | Refraction | 33.0898 |
|  | 38 | Spherical | Infinity | −95.0015 |  | Refraction | 513.9232 |
|  | 39 | Spherical | Infinity | −301.0048 |  | Refraction | 873.4344 |
| S | 40 | Spherical | Infinity | 0.0000 |  | Refraction | 2012.5170 |

The aspheric coefficients of each of the aspheric surfaces of the second optical element 34 are listed below.

| Surface number | S33 | S35 | S37 |
|---|---|---|---|
| Radius of curvature in axis-Y direction | 43.3299 | −20.7986 | 43.3299 |
| Conic constant (k) | 0.784834378 | −3.517637827 | 0.784834378 |
| Fourth-order coefficient (A) | −4.89548E−07 | −1.03308E−05 | −4.89548E−07 |
| Sixth-order coefficient (B) | −6.28825E−09 | 3.81030E−08 | −6.28825E−09 |
| Eighth-order coefficient (C) | 1.27262E−11 | −5.78676E−11 | 1.27262E−11 |
| Tenth-order coefficient (D) | −8.63796E−15 | 5.74521E−14 | −8.63796E−15 |
| Twelfth-order coefficient (E) | 2.12690E−18 |  | 2.12690E−18 |

The maximum object height, the F number, the projection angle, and TR of the projection system 3A in the second form are as follows: The maximum object height is the dimension from the first optical axis N of the projection system 3A in the second form to the farthest point therefrom in the image formation region of the surface of each of the liquid crystal panels 18. The maximum object height is expressed in millimeters. The F number is abbreviated to FNO. The projection angle is the second projection angle 62 in degrees. TR stands for the throw ratio and is the quotient of the operation of dividing the projection distance by the axis-X-direction dimension of a projection image projected on the screen S.

| | |
|---|---|
| Maximum object height | 11.7 |
| FNO | 2.2 |
| Projection angle | 70.9 |
| TR (0.59" 16:9LV) | 0.304 |

Effects and Advantages

The projection system 3A according to the present example includes the first optical system 31 and the second optical system 32 sequentially arranged from the reduction side toward the enlargement side. The projection system 3A further includes the first optical element 33, which has the first light incident surface 41, the first reflection surface 42, and the first light exiting surface 43 arranged from the reduction side, and the second optical element 34, which has the second light incident surface 46, the second reflection surface 47, and the second light exiting surface 48 arranged from the reduction side, and one of the first optical element 33 and the second optical element 34 is interchangeably placed to the second optical system 32. The projection system 3A further includes the placement mechanism 60, which selectively places one of the first optical element 33 and the second optical element 34 to the second optical system 32.

Therefore, in the projection system 3A according to the present example, the light exiting surface can refract the light flux reflected off the reflection surface both when the first optical element 33 is selected as the second optical system 32 and the case where the second optical element 34 is selected as the second optical system 32. The projection distance of the projection system is therefore readily shortened as compared with a case where the second optical system has only the reflection surface. In other words, the projection system 3A according to the present example can have a short focal length as compared with the case where the second optical system has only the reflection surface.

Further, in the present example, the first projection angle θ1 differs from the second projection angle θ2, where the first projection angle θ1 is the projection angle when the first optical element 33 is placed to the second optical system 32 and the second projection angle 82 is the projection angle when the second optical element 34 is placed to the second optical system 32. That is, in the present example, the projection angle of the projection system 3A when the first optical element 33 is selected as the second optical system 32 can be different from the projection angle of the projection system 3A when the second optical element 34 is selected as the second optical system 32. In the related art on the other hand, the entire projection system needs to be exchanged to change the projection angle. In contrast, the projection system 3A according to the present example allows the projection angle to be changed only by selectively placing one of the two second optical systems 32 provided in advance. The projection angle of the projector can therefore be changed with the lens exchange cost suppressed.

Further, in the present example, the first optical system 31 is commonly used both when the first optical element 33 is selected as the second optical system 32 and when the second optical element 34 is selected as the second optical system 32. That is, the single first optical system is used. The cost required to change the projection angle can therefore be suppressed.

In the projection system 3A in the first form, in which the first optical element 33 has the convex first light exiting surface 43 protruding toward the enlargement side, the first light exiting surface 43 can refract the light flux. The first light exiting surface 43 can therefore suppress inclination of the intermediate image 35, which is conjugate with the screen S, which is the enlargement-side image formation plane, with respect to the second optical axis M of the first reflection surface 42 and the resultant increase in the size of the intermediate image 35. An increase in the size of the first reflection surface 42, which is located on the enlargement side of the intermediate image 35, can therefore be suppressed. Similarly, in the projection system 3A in the second form, in which the second optical element 34 has the convex second light exiting surface 48 protruding toward the enlargement side, the second light exiting surface 48 can refract the light flux. The second light exiting surface 48 can therefore suppress inclination of the intermediate image 35, which is conjugate with the screen S, which is the enlargement-side image formation plane, with respect to the second optical axis M of the second reflection surface 47 and the resultant increase in the size of the intermediate image 35. An increase in the size of the second reflection surface 47, which is located on the enlargement side of the intermediate image 35, can therefore be suppressed.

The first light incident surface 41, the first reflection surface 42, and the first light exiting surface 43 of the first optical element 33 each have a shape rotationally symmetric around the second optical axis M of the first reflection surface 42 as the axis of rotation. The first optical element 33 is therefore readily manufactured. Further, since the first optical element 33 has a rotationally symmetric shape, the first optical element 33 is manufactured with an improved yield as compared with a case where the first optical element 33 has no rotationally symmetric shape. Similarly, the second light incident surface 46, the second reflection surface 47, and the second light exiting surface 48 of the second optical element 34 each have a shape rotationally symmetric around the second optical axis M of the second reflection surface 47 as the axis of rotation. The second optical element 34 is therefore readily manufactured. Further, since the second optical element 34 has a rotationally symmetric shape, the second optical element 34 is manufactured with an improved yield as compared with a case where the second optical element 34 has no rotationally symmetric shape.

The pupil P of the second optical system 32 (first pupil P1 and second pupil P2) inclines with respect to the imaginary vertical line V perpendicular to the second optical axis M of the first reflection surface 42 and the second reflection surface 47 both when the first optical element 33 is selected as the second optical system 32 and when the second optical element 34 is selected as the second optical system 32. A decrease in the amount of light at a periphery of the screen S that is the periphery on the upper side Y1 can therefore be suppressed as compared with a case where the pupil P of the second optical system 32 is parallel to the imaginary vertical line V. That is, in the configuration in which the pupil P inclines with respect to the imaginary vertical line V, the amount of light flux F1, which reaches the upper portion of the screen S, increases as compared with the case where the pupil P is parallel to the imaginary vertical line V. Further, when the amount of light flux F1, which reaches the upper portion of the screen S, increases, the difference in the amount of light between the light flux F1 and the light flux F3, which reaches the lower portion of the screen S, decreases. A decrease in the amount of light at the upper periphery of the screen S as compared with that at the lower periphery of the screen S can therefore be suppressed.

Further, in the first optical element 33 in the present example, the first light incident surface 41, which is located on the reduction side of the intermediate image 35, is an aspheric surface, whereby occurrence of aberrations at the intermediate image 35 can be suppressed. The first reflection surface 42 and the first light exiting surface 43 of the first optical element 33 are also each an aspheric surface. Occurrence of aberrations can therefore be suppressed in the enlargement-side image formation plane. Similarly, in the second optical element 34 in the present example, the second light incident surface 46, which is located on the reduction side of the intermediate image 35, is an aspheric surface, whereby occurrence of aberrations at the intermediate image 35 can be suppressed. The second reflection surface 47 and the second light exiting surface 48 of the second optical element 34 are also each an aspheric surface. Occurrence of aberrations can therefore be suppressed in the enlargement-side image formation plane.

In the present example, the shapes of the first light incident surface 41, the first reflection surface 42, and the first light exiting surface 43 of the first optical element 33 differ from the shapes of the second light incident surface 46, the second reflection surface 47, and the second light exiting surface 48 of the second optical element 34, respectively. The projection angle of the projection system is therefore readily changed when the first optical element 33 or the second optical element 34 is selectively placed.

Further, in the present example, the first angle of incidence at which the chief ray of the first light flux reflected off the first reflection surface 42 is incident on the first light exiting surface 43 in the first optical element 33 is greater than the second angle of incidence at which the chief ray of the second light flux reflected off the second reflection surface 47 is incident on the second light exiting surface 48 in the second optical element 34. The arrangement described above allows the first projection angle θ1 of the projection system 3A in the first form to be greater than the second projection angle θ2 of the projection system in the second form.

Figure 10:
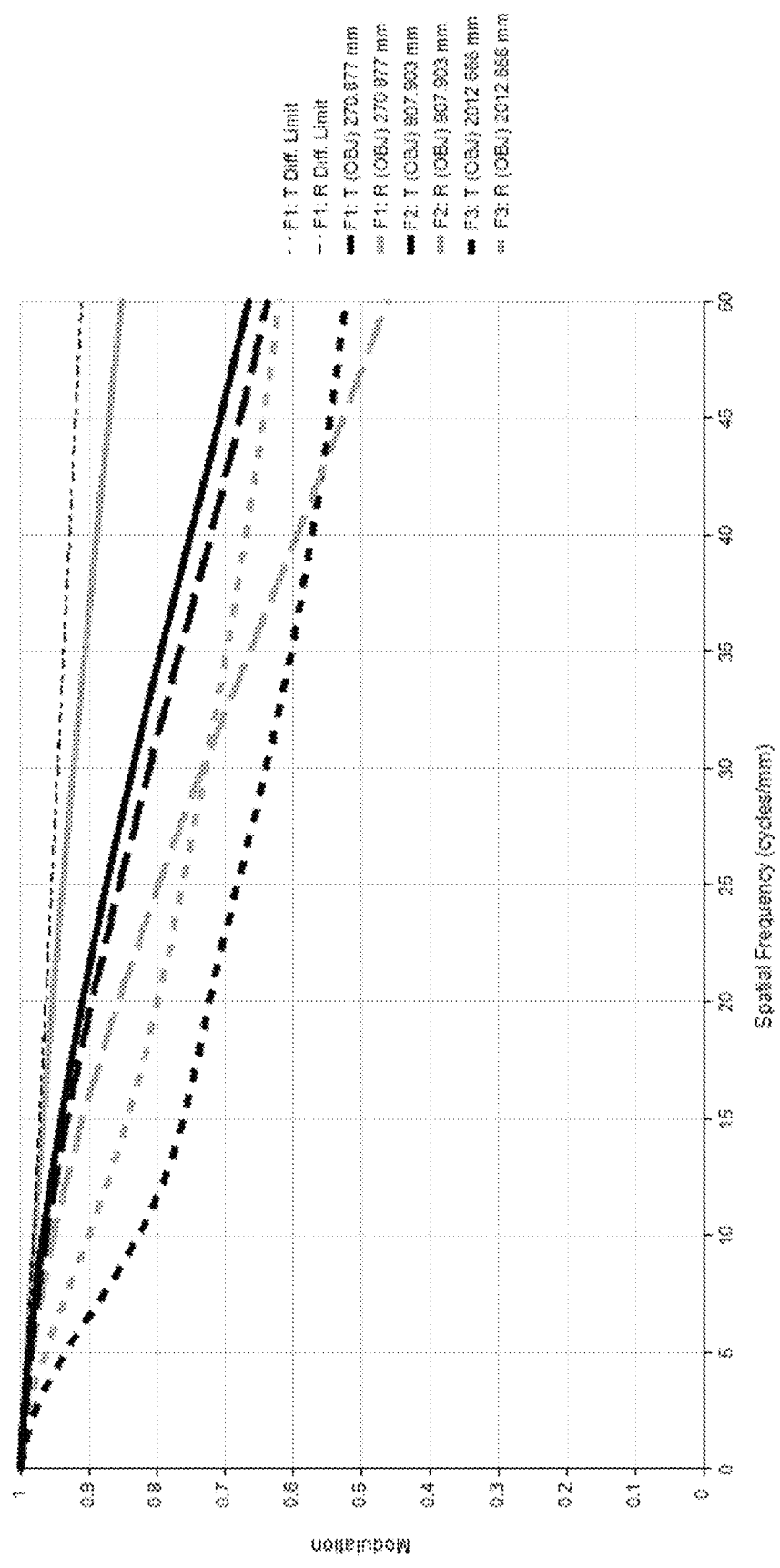
FIG. 10 shows the enlargement-side MTF of the projection system in the first form according to Example 1.
Figure 11:
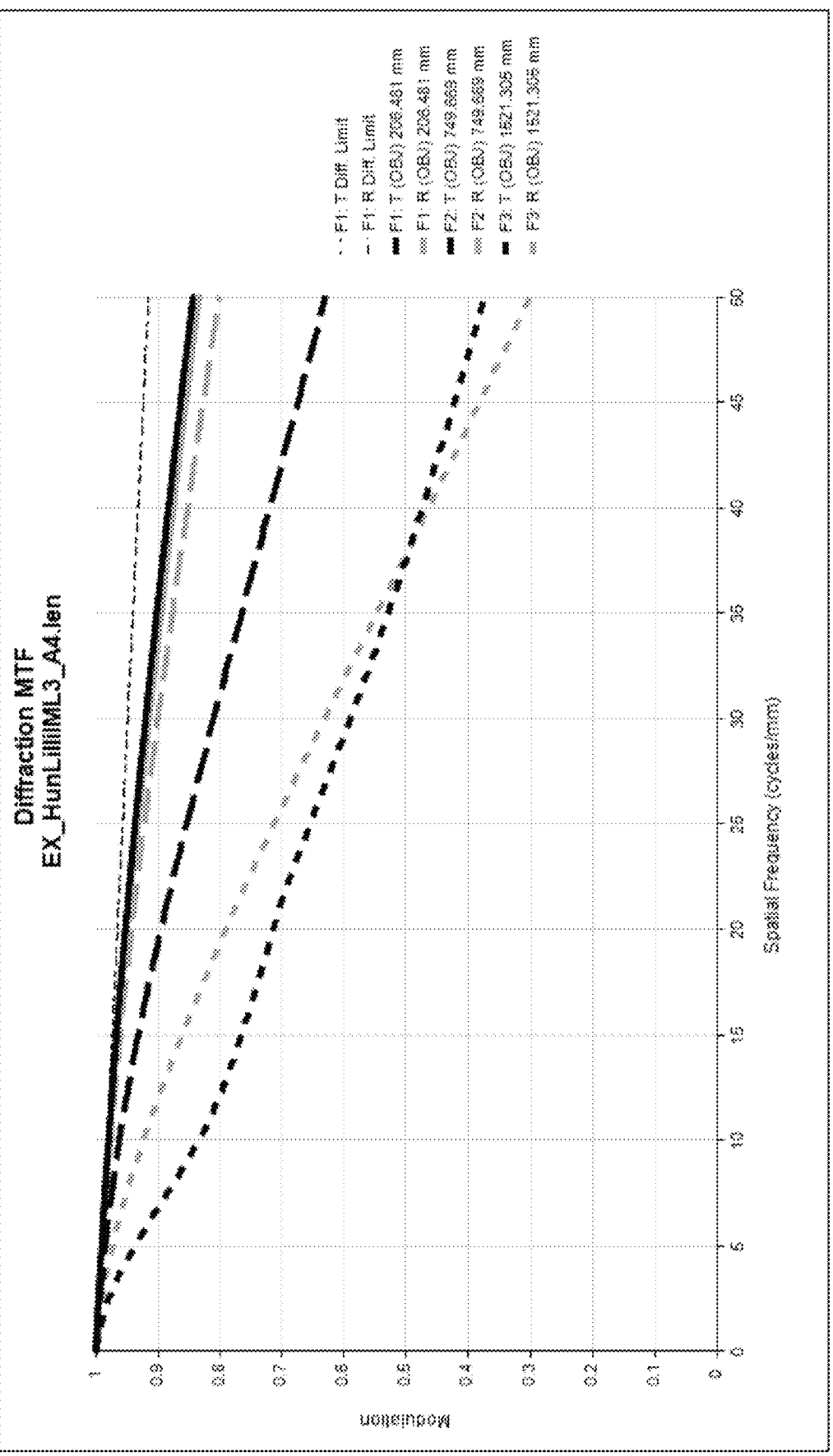
FIG. 11 shows the enlargement-side MTF of the projection system in the second form according to Example 1.

FIG. 10 shows the enlargement-side MTF of the projection system 3A in the first form. FIG. 11 shows the enlargement-side MTF of the projection system. 3A in the second form. In FIGS. 10 and 11, the horizontal axis represents the spatial frequency, and the vertical axis represents a contrast reproduction ratio. In FIGS. 10 and 11, the black graphs represent tangential light rays (T), and the gray graphs represent radial light rays (R). Out of the tangential light rays (T) and the radial light rays (R), the solid lines represent the light flux F1, the long-line-segment broken lines represent the light flux F2, and the broken lines represent the light flux F3. The projection system 3A according to the present example provides high resolution, as shown in FIGS. 10 and 11.

Example 2

Figure 12:
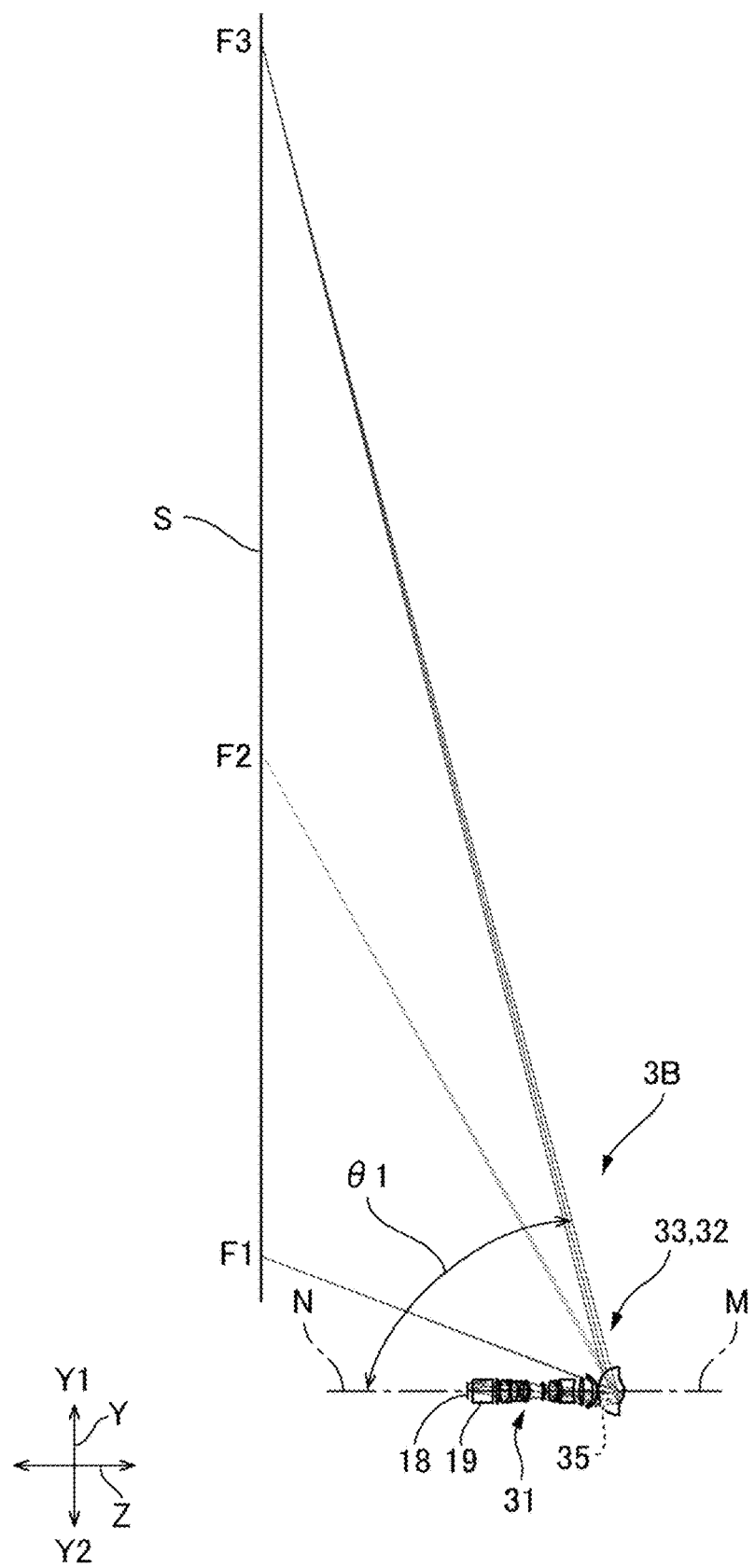
FIG. 12 is a light ray diagram diagrammatically showing the entire projection system in the first form according to Example 2.
Figure 13:
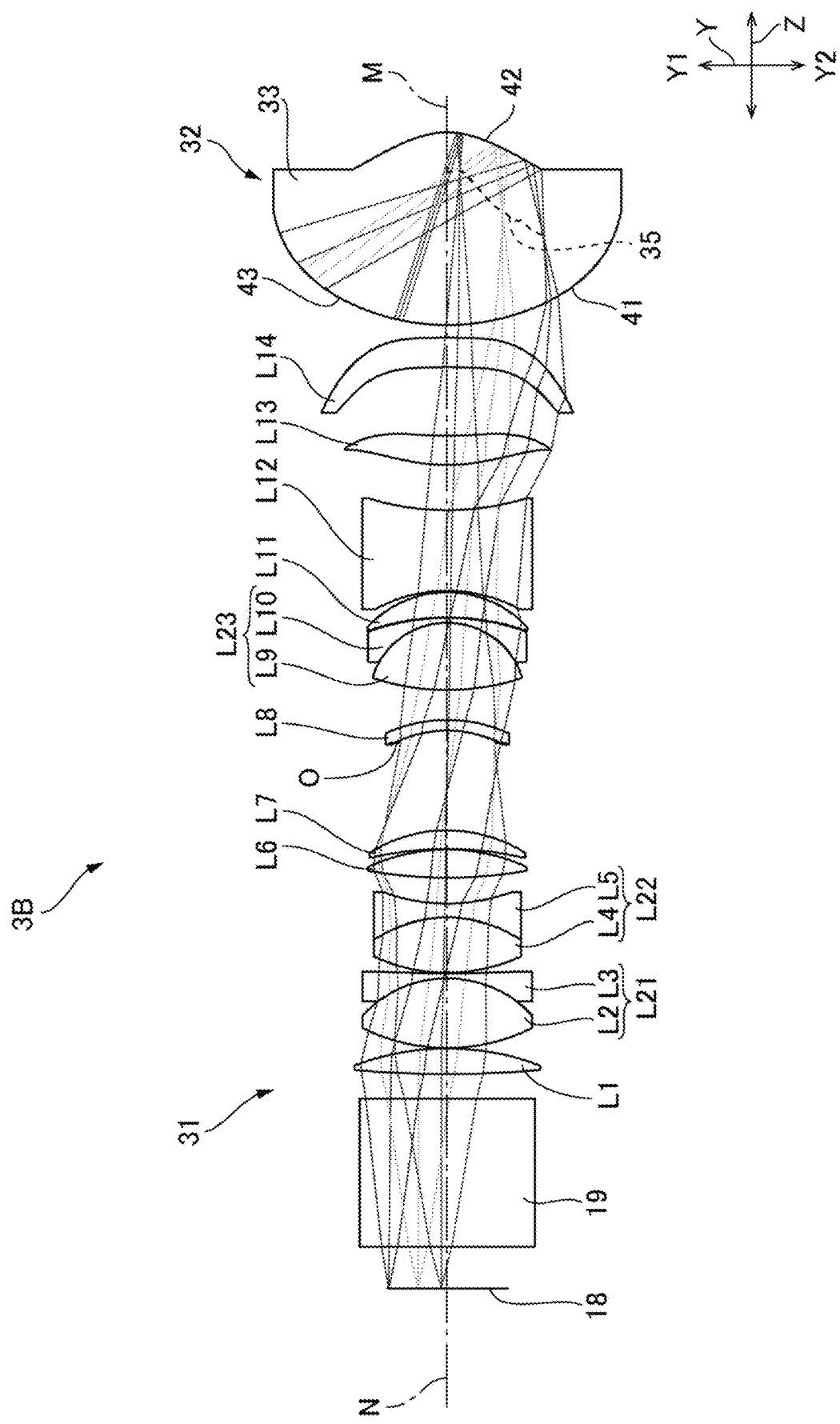
FIG. 13 is a light ray diagram of the first form of the projection system according to Example 2.
Figure 14:
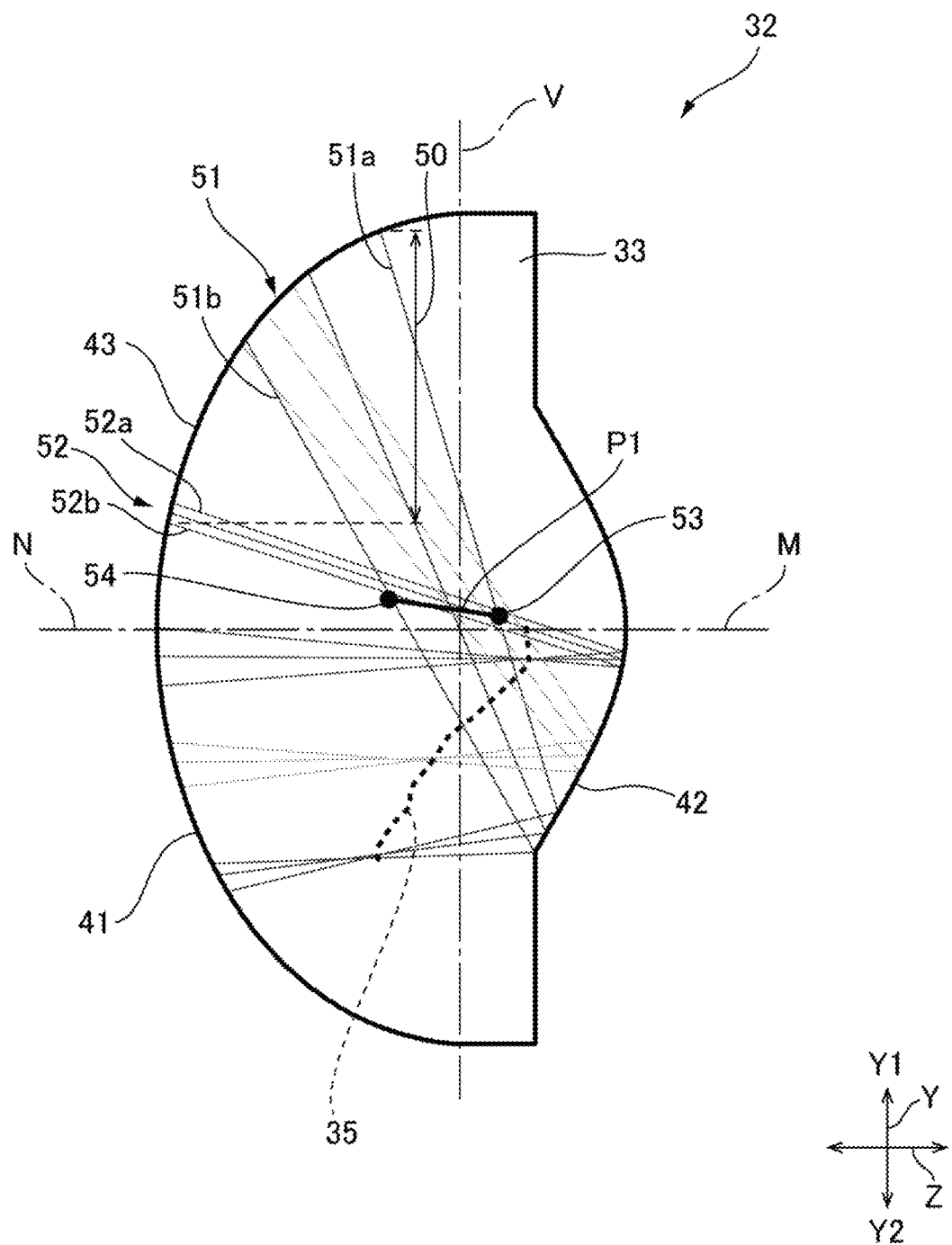
FIG. 14 is a light ray diagram of the second optical system in the first form of the projection system according to Example 2.
Figure 15:
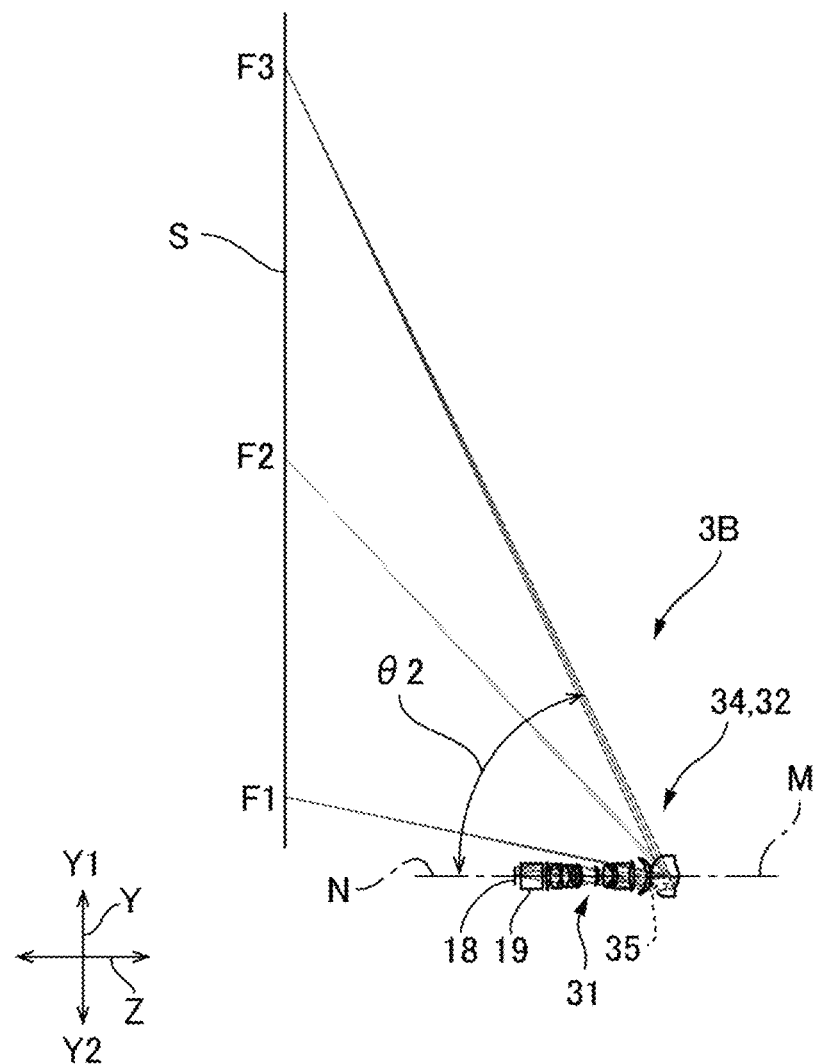
FIG. 15 is a light ray diagram diagrammatically showing the entire projection system in the second form according to Example 2.
Figure 16:
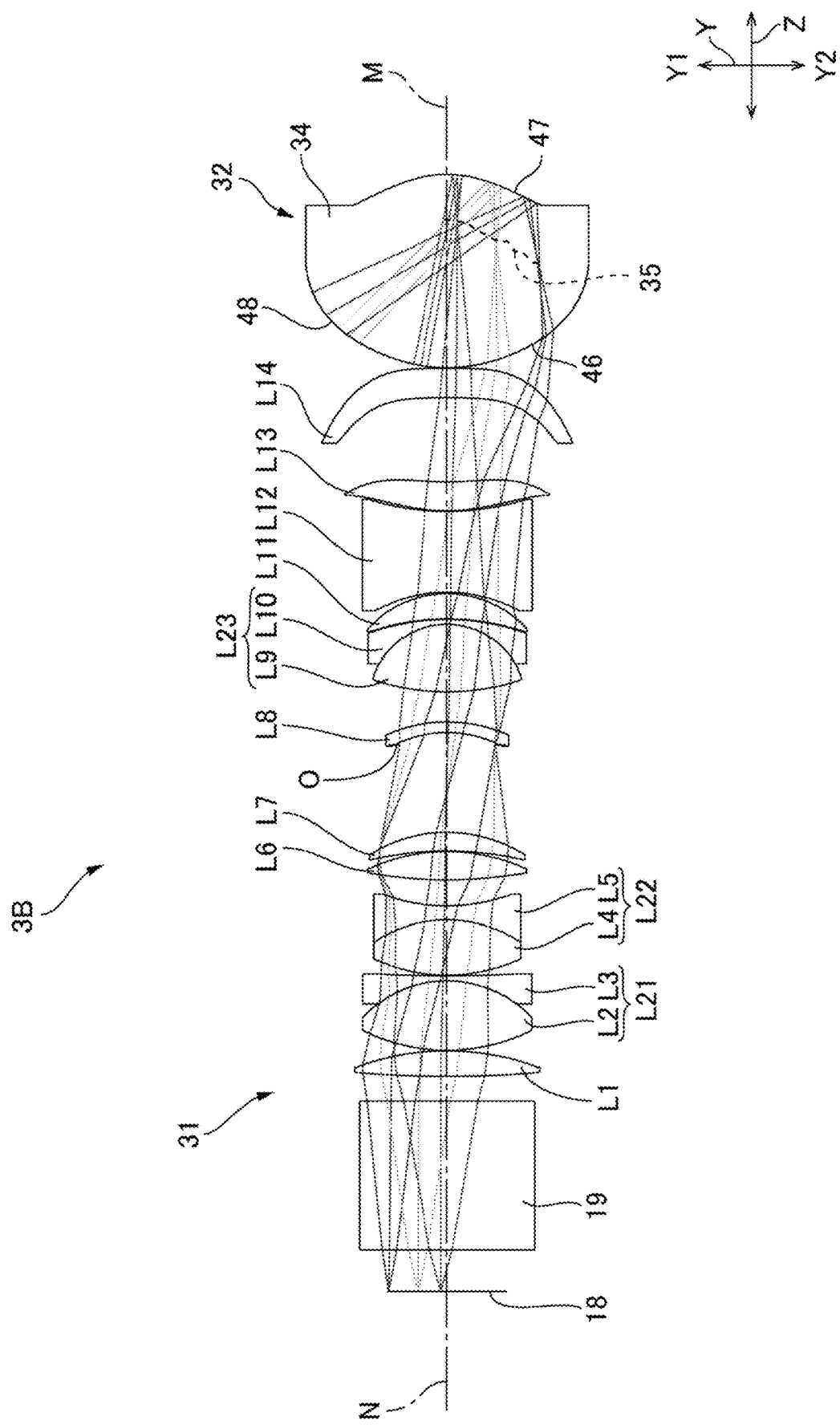
FIG. 16 is a light ray diagram of the second form of the projection system according to Example 2.
Figure 17:
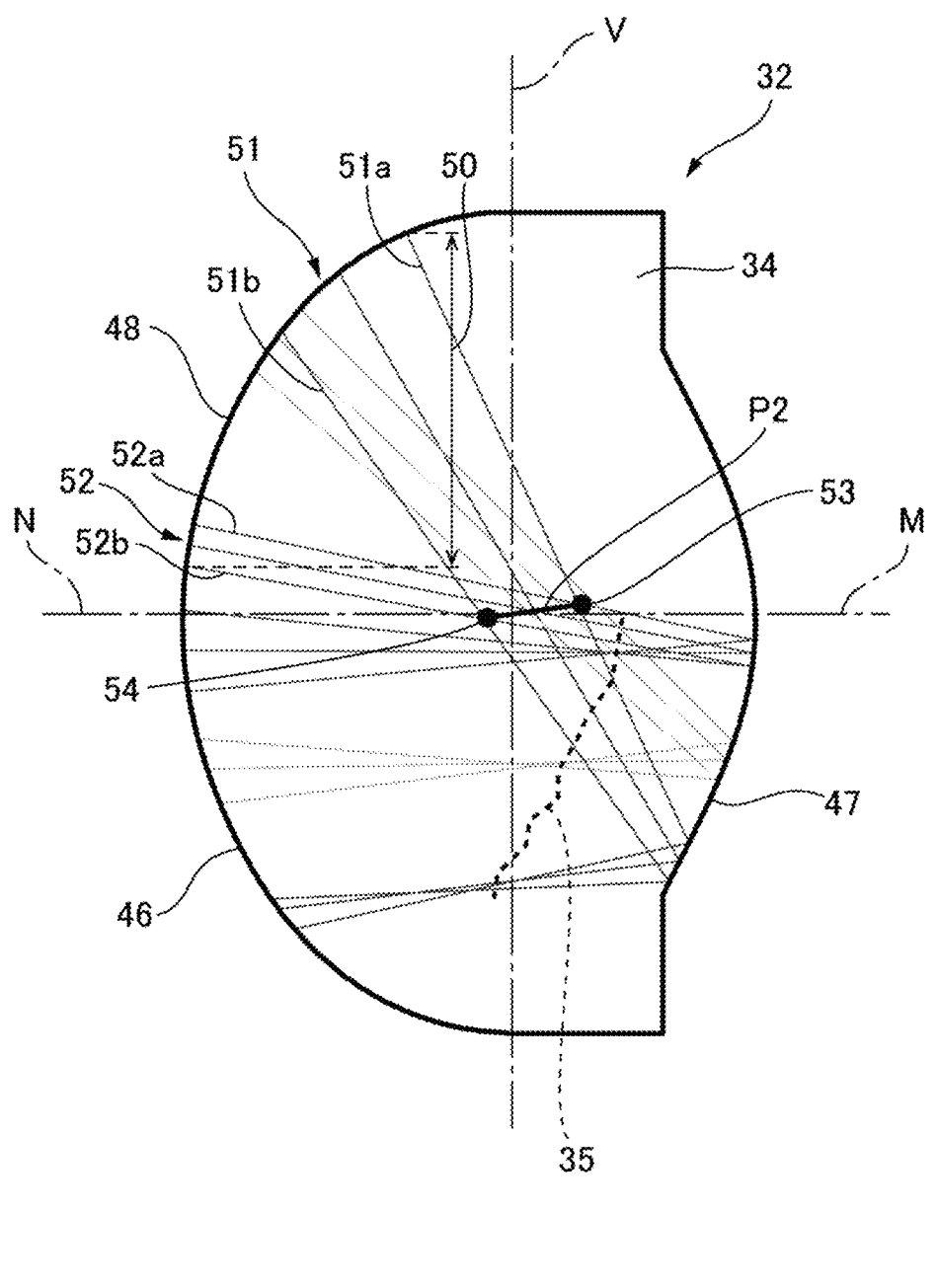
FIG. 17 is a light ray diagram of the second optical system in the second form of the projection system according to Example 2.

FIG. 12 is a light ray diagram diagrammatically showing the entirety of a projection system 3B in the first form according to Example 2. FIG. 13 is a light ray diagram of the first form of the projection system 3B according to Example 2. FIG. 14 is a light ray diagram of the second optical system in the first form of the projection system 3B according to Example 2. FIG. 15 is a light ray diagram diagrammatically showing the entirety of the projection system 3B in the second form according to Example 2. FIG. 16 is a light ray diagram of the second form of the projection system 3B according to Example 2. FIG. 17 is a light ray diagram of the second optical system in the second form of the projection system 3B according to Example 2.

The projection system 3B in the first form can perform wide-angle projection, as shown in FIG. 12. That is, the first projection angle θ1, which is the projection angle over which the projection system 3B in the first form projects the final image on the screen S, is relatively large. FIGS. 12 and 15 diagrammatically show the light fluxes F1 to F3, which exit out of the projection system 3B according to the present example and reach the screen S. The light flux F1 is a light flux that reaches a smallest image height position. The light flux F3 is a light flux that reaches a largest image height position. The light flux F2 is a light flux that reaches a position between the position that the light flux F1 reaches and the position that the light flux F3 reaches. The projection angle used herein is the angle between the first optical axis N of the first optical system 31 and the outermost light ray of the light flux F3.

First Form of Example 2

The projection system 3B in the first form includes the first optical system 31 and the second optical system 32 sequentially arranged from the reduction side toward the enlargement side, as shown in FIG. 12. The first optical system 31 is a refractive optical system including a plurality of lenses. The second optical system 32 is formed of the first optical element 33. The first optical element 33 has the first light incident surface 41, the first reflection surface 42, and the first light exiting surface 43 sequentially arranged from the reduction side. The first light incident surface 41 has a convex shape protruding toward the reduction side. The first reflection surface 42 has a concave shape. The first light exiting surface 43 has a convex shape protruding toward the enlargement side. The first optical element 33, which forms the second optical system 32, is disposed on the first optical axis N of the first optical system 31. In the present example, the first optical axis N of the first optical system 31 coincides with the second optical axis M of the first reflection surface 42 of the first optical element 33.

The liquid crystal panels 18 of the image formation section 2 are disposed in the reduction-side image formation plane of the projection system 3B. The liquid crystal panels 18 form the projection images on one side of the first optical axis N of the first optical system 31 in a plane perpendicular to the first optical axis N. The screen S is disposed in the enlargement-side image formation plane of the projection system 3B. The intermediate image 35 conjugate with the reduction-side image formation plane is formed between the first optical system 31 and the first reflection surface 42 of the first optical element 33. The intermediate image 35 is conjugate also with the enlargement-side image formation plane. In the present example, the intermediate image 35 is formed inside the first optical element 33. That is, the intermediate image 35 is formed between the first light incident surface 41 and the first reflection surface 42 of the first optical element 33.

In the present example, the first optical axis N of the first optical system 31 and the second optical axis M of the first reflection surface 42 of the first optical element 33 extend in the axis-Z direction. FIGS. 12, 13, and 14 are each a light ray diagram in the plane YZ. The liquid crystal panels 18 form the projection images on the upper side Y1 of the first optical axis N of the first optical system 31.

The first optical system 31 includes the cross dichroic prism 19 and 14 lenses L1 to L14, as shown in FIG. 13. The lenses L1 to L14 are arranged in the presented order from the reduction side toward the enlargement side. In the present example, the lenses L2 and L3 are bonded to each other into the first doublet L21. The lenses L4 and L5 are bonded to each other into the second doublet L22. The lenses L9 and L10 are bonded to each other into the third doublet L23. The aperture O is disposed between the lens L7 and the lens L8.

The first optical element 33 is designed by using the second optical axis M of the first reflection surface 42 as the axis in the design stage, as shown in FIG. 14. In other words, the second optical axis M is the design-stage optical axis of the first light incident surface 41, the first light exiting surface 43, and the first reflection surface 42. The first light incident surface 41 and the first reflection surface 42 are located on the lower side Y2 of the second optical axis M of the first reflection surface 42, and the first light exiting surface 43 is located on the upper side Y1 of the second optical axis M of the first reflection surface 42. In the present example, the first light incident surface 41, the first reflection surface 42, and the first light exiting surface 43 of the first optical element 33 each have a shape rotationally symmetric around the second optical axis M of the first reflection surface 42 as the axis of rotation. The first light incident surface 41 and the first light exiting surface 43 therefore form a rotationally symmetric shape. The first light incident surface 41, the first reflection surface 42, and the first light exiting surface 43 of the first optical element 33 are each an aspheric surface. The first reflection surface 42 is a reflection coating layer provided on a surface of the first optical element 33 that is the surface opposite the first light incident surface 41. The aspheric surfaces are each a free-form surface in some cases. Also in this case, the free-form surfaces are designed by using the second optical axis M as the design-stage axis.

The first pupil P1 of the second optical system 32 is located inside the first optical element 33, as shown in FIG. 14. The first pupil P1 of the second optical system 32 in the plane YZ is defined by the line that connects the upper intersection 53, where the upper peripheral light ray 51a of the upper end light flux 51 passing through the axis-Y-direction upper end of the effective light ray range of the first light exiting surface 43 and the upper peripheral light ray 52a of the lower end light flux 52 passing through the axis-Y-direction lower end of the effective light ray range 50 intersect each other in the plane YZ, to the lower intersection 54, where the lower peripheral light ray 51b of the upper end light flux 51 and the lower peripheral light ray 52b of the lower end light flux 52 intersect each other in the plane YZ. The first pupil P1 inclines with respect to the imaginary vertical line V perpendicular to the second optical axis M of the first reflection surface 42 in the plane YZ.

Lens Data

Data on the lenses of the projection system 3B are listed below. The surfaces of the lenses are numbered sequentially from the reduction side toward the enlargement side. Reference characters are given to the lenses, the first light incident surface, the first reflection surface, and the first light exiting surface. Data labeled with a surface number that does not correspond to any of the lenses, the first light incident surface, the first reflection surface, and the first light exiting surface is dummy data. Reference character R denotes the radius of curvature. Reference character D denotes the axial inter-surface distance. Reference character C denotes the aperture radius. Reference characters R, D, and C are each expressed in millimeters.

| Reference character | Surface number | Shape | R | D | Glass material | Refraction/ reflection | C |
|---|---|---|---|---|---|---|---|
| | 0 | Spherical | Infinity | 8.4859 | | Refraction | 0.0000 |
| 18 | 1 | Spherical | Infinity | 30.1506 | SBSL7_OHARA | Refraction | 13.0791 |
| 19 | 2 | Spherical | Infinity | 5.0143 | | Refraction | 16.2353 |
| | 3 | Spherical | Infinity | 0.0000 | | Refraction | 17.0378 |
| | 4 | Spherical | Infinity | 0.0000 | | Refraction | 17.0378 |
| | 5 | Spherical | Infinity | 0.0000 | | Refraction | 17.0378 |
| L1 | 6 | Spherical | 208.6545 | 5.2079 | 846663.2378 | Refraction | 17.1508 |
| | 7 | Spherical | −50.8988 | 0.1000 | | Refraction | 17.2211 |
| L2 | 8 | Spherical | 36.8543 | 14.2150 | 454294.8218 | Refraction | 15.6673 |
| L3 | 9 | Spherical | −22.5903 | 1.0000 | 843402.2598 | Refraction | 13.8362 |
| | 10 | Spherical | 236.0866 | 0.1390 | | Refraction | 13.5990 |
| L4 | 11 | Spherical | 33.8621 | 11.1910 | 459927.8531 | Refraction | 13.5407 |
| L5 | 12 | Spherical | −25.9849 | 2.8206 | 845715.2419 | Refraction | 12.7904 |
| | 13 | Spherical | 36.1675 | 5.2726 | | Refraction | 12.8547 |
| L6 | 14 | Spherical | 86.7155 | 5.7825 | 845955.238 | Refraction | 14.4698 |
| | 15 | Spherical | −36.4831 | 0.1000 | | Refraction | 14.6412 |
| L7 | 16 | Spherical | −64.8378 | 3.7957 | 454002.8399 | Refraction | 14.3829 |
| | 17 | Spherical | −28.2734 | 17.7527 | | Refraction | 13.5002 |
| O1 | 18 | Spherical | Infinity | 2.5268 | | Refraction | 9.3221 |
| L8 | 19 | Spherical | −23.2500 | 2.1606 | 737187.5312 | Refraction | 10.5361 |
| | 20 | Spherical | −29.1624 | 6.0204 | | Refraction | 11.2691 |
| L9 | 21 | Spherical | 46.1866 | 13.7216 | 666888.3032 | Refraction | 13.5509 |
| L10 | 22 | Spherical | −15.4811 | 1.0000 | 845175.2515 | Refraction | 13.5566 |
| | 23 | Spherical | −45.4883 | 0.1000 | | Refraction | 14.5996 |
| L11 | 24 | Spherical | −46.5394 | 5.1285 | 437001.951 | Refraction | 14.6009 |
| | 25 | Spherical | −21.2061 | 0.2919 | | Refraction | 14.7583 |
| L12 | 26 | Spherical | −29.2680 | 16.4379 | 834702.4273 | Refraction | 13.8241 |
| | 27 | Spherical | 51.7480 | 9.0958 | | Refraction | 15.7392 |
| L13 | 28 | Aspheric | 32.1031 | 6.0001 | E48R_ZEON | Refraction | 20.7662 |
| | 29 | Aspheric | 60.7245 | 13.9914 | | Refraction | 20.7662 |
| L14 | 30 | Aspheric | −228.1519 | 6.0001 | E48R_ZEON | Refraction | 22.0626 |
| | 31 | Aspheric | −1050.9549 | 2.6027 | | Refraction | 23.5701 |
| | 32 | Spherical | Infinity | 0.0000 | | Refraction | 22.4862 |
| 41 | 33 | Aspheric | 42.9433 | 39.2342 | Z330R_ZEON | Refraction | 22.0519 |
| | 34 | Spherical | Infinity | 0.0000 | Z330R_ZEON | Refraction | 18.5297 |
| 42 | 35 | Aspheric | −15.4921 | 0.0000 | Z330R_ZEON | Reflection | 18.7876 |
| | 36 | Spherical | Infinity | −39.2342 | Z330R_ZEON | Refraction | 33.9454 |
| 43 | 37 | Aspheric | 42.9433 | −110.0018 | | Refraction | 33.4079 |
| | 38 | Spherical | Infinity | −95.0015 | | Refraction | 518.8422 |
| | 39 | Spherical | Infinity | −301.0048 | | Refraction | 877.1733 |
| S | 40 | Spherical | Infinity | 0.0000 | | Refraction | 2012.5172 |

The aspheric coefficients of each of the aspheric surfaces are listed below.

| Surface number | S28 | S29 | S30 | S31 |
|---|---|---|---|---|
| Radius of curvature in axis-Y direction | 32.1031 | 60.7245 | −228.1519 | −1050.9549 |
| Conic constant (k) | −0.441757802 | −25.25718891 | 90 | 0 |
| Fourth-order coefficient (A) | −2.89277E−05 | −3.89388E−05 | −3.37813E−05 | −5.64772E−05 |
| Sixth-order coefficient (B) | 4.17176E−08 | 3.85256E−08 | −3.39553E−08 | 5.64604E−08 |

-continued

| Surface number | S28 | S29 | S30 | S31 |
|---|---|---|---|---|
| Eighth-order coefficient (C) | −5.83352E−11 | −3.28917E−11 | 7.47850E−11 | −4.30075E−11 |
| Tenth-order coefficient (D) | | | | |
| Twelfth-order coefficient (E) | | | | |

| Surface number | S33 | S35 | S37 |
|---|---|---|---|
| Radius of curvature in axis-Y direction | 42.9433 | −15.4921 | 42.9433 |
| Conic constant (k) | 0.508272266 | −3.277192413 | 0.508272266 |
| Fourth-order coefficient (A) | −2.53066E−06 | −9.22878E−06 | −2.53066E−06 |
| Sixth-order coefficient (B) | −5.39889E−10 | 3.33646E−08 | −5.39889E−10 |
| Eighth-order coefficient (C) | 5.51895E−12 | −4.61597E−11 | 5.51895E−12 |
| Tenth-order coefficient (D) | −5.67337E−15 | 3.44417E−14 | −5.67337E−15 |
| Twelfth-order coefficient (E) | 1.96436E−18 | | 1.96436E−18 |

The maximum object height, the F number, the projection angle, and TR of the projection system 3B in the first form are as follows: The maximum object height is the dimension from the first optical axis N of the projection system 3B in the first form to the farthest point therefrom in the image formation region of the surface of each of the liquid crystal panels 18. The maximum object height is expressed in millimeters. The F number is abbreviated to FNO. The projection angle is the first projection angle θ1 in degrees. TR stands for the throw ratio and is the quotient of the operation of dividing the projection distance by the axis-X-direction dimension of a projection image projected on the screen S.

| | |
|---|---|
| Maximum object height | 11.7 |
| FNO | 1.880 |
| Projection angle | 75.3 |
| TR (0.59" 16:9LV) | 0.230 |

Second Form of Example 2

The second projection angle θ2, which is the projection angle over which the projection system 3B in the second form projects the final image on the screen S, is smaller than the first projection angle θ1, over which the projection system 3B in the first form projects the final image on the screen S, as shown in FIGS. 12 and 15.

The projection system 3B in the second form is formed of the first optical system 31 and the second optical system 32 sequentially arranged from the reduction side toward the enlargement side, as shown in FIG. 16. The second optical system 32 is formed of the second optical element 34. The second optical element 34 has the second light incident surface 46, the second reflection surface 47, and the second light exiting surface 48 sequentially arranged from the reduction side. The second light incident surface 46 has a convex shape protruding toward the reduction side. The second reflection surface 47 has a concave shape. The second light exiting surface 48 has a convex shape protruding toward the enlargement side. The second optical element 34, which forms the second optical system 32, is disposed on the first optical axis N of the first optical system 31. In the present example, the first optical axis N of the first optical system 31 coincides with the second optical axis M of the second reflection surface 47. The first optical system 31 is the same as that of the projection system in the first form. The arrangement of the liquid crystal panels 18 is the same as that in the projection system in the first form.

The intermediate image 35 conjugate with the reduction-side image formation plane is formed between the first optical system 31 and the second reflection surface 47 of the second optical element 34. The intermediate image 35 is conjugate also with the enlargement-side image formation plane. The intermediate image 35 is formed inside the second optical element 34. That is, the intermediate image 35 is formed between the second light incident surface 46 and the second reflection surface 47 of the second optical element 34.

The second optical element 34 is designed by using the second optical axis M of the second reflection surface 47 as the axis in the design stage, as shown in FIG. 17. In other words, the second optical axis M is the design-stage optical axis of the second light incident surface 46, the second light exiting surface 48, and the second reflection surface 47. The second light incident surface 46 and the second reflection surface 47 are located on the lower side Y2 of the second optical axis M of the second reflection surface 47, and the second light exiting surface 48 is located on the upper side Y1 of the second optical axis M of the second reflection surface 47. In the present example, the second light incident surface 46, the second reflection surface 47, and the second light exiting surface 48 of the second optical element 34 each have a shape rotationally symmetric around the second optical axis M of the second reflection surface 47 as the axis of rotation. The second light incident surface 46 and the second light exiting surface 48 therefore form a rotationally symmetric shape. The second light incident surface 46, the second reflection surface 47, and the second light exiting surface 48 of the second optical element 34 are each an aspheric surface. The second reflection surface 47 is a reflection coating layer provided on a surface of the second optical element 34 that is the surface opposite the second light incident surface 46. The aspheric surfaces are each a free-form surface in some cases. Also in this case, the free-form surfaces are designed by using the second optical axis M as the design-stage axis.

Figure 18:
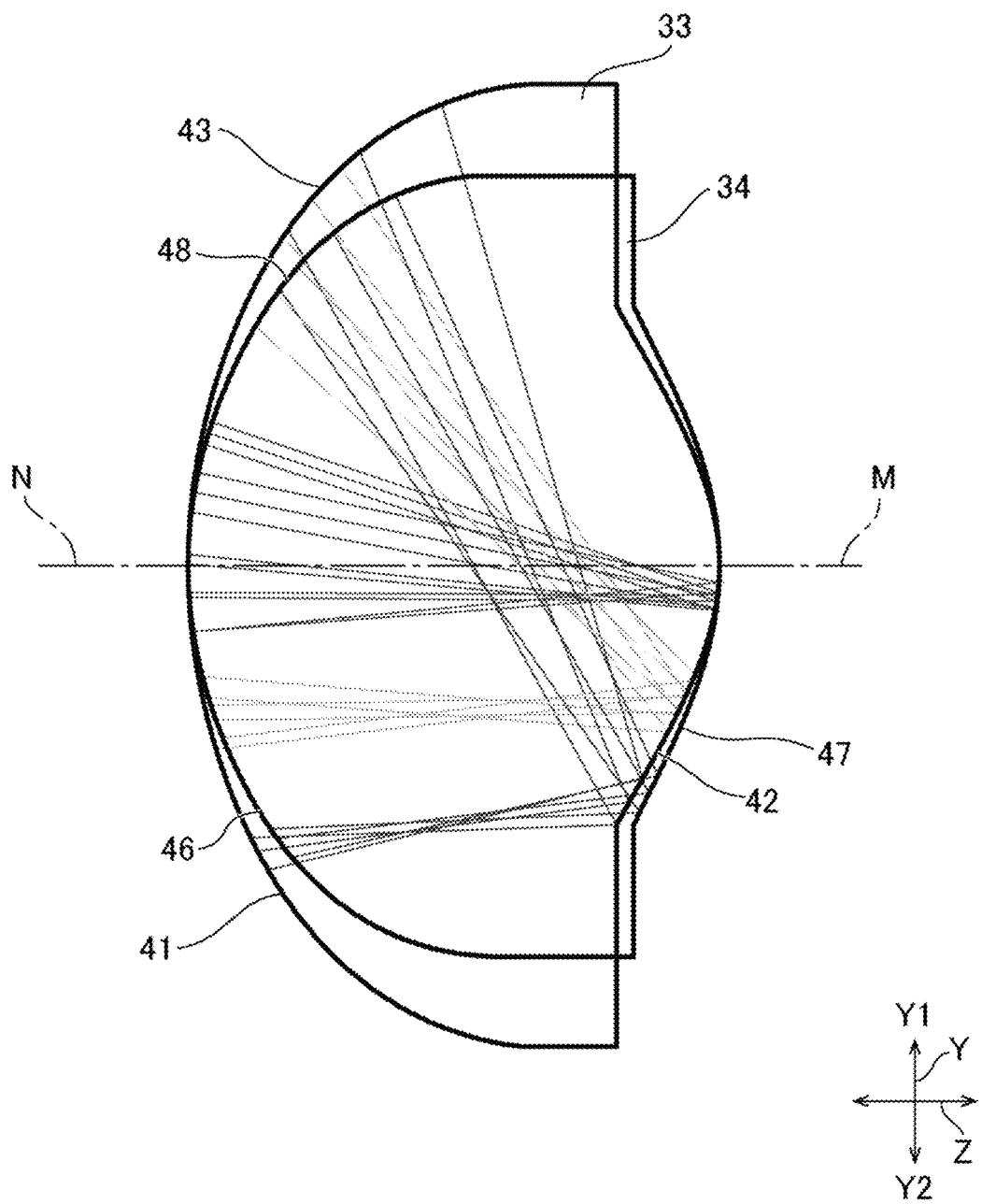
FIG. 18 describes the difference in shape between the first optical element and the second optical element in Example 2.

FIG. 18 describes the difference in shape between the first optical element 33 and the second optical element 34. FIG. 18 shows the first optical element 33 and the second optical element 34 superimposed on each other. The shapes of the first light incident surface 41, the first reflection surface 42, and the first light exiting surface 43 of the first optical element 33 differ from the shapes of the second light incident surface 46, the second reflection surface 47, and the second light exiting surface 48 of the second optical element 34, respectively, as shown in FIG. 18. That is, the aspheric shape of the second light incident surface 46 of the second optical element 34 differs from the aspheric shape of the first light incident surface 41 of the first optical element 33. The aspheric shape of the second reflection surface 47 of the second optical element 34 differs from the aspheric shape of the first reflection surface 42 of the first optical element 33. The aspheric shape of the second light exiting surface 48 of the second optical element 34 differs from the aspheric shape of the first light exiting surface 43 of the first optical element 33. Further, the first angle of incidence, at which the chief ray of the first light flux reflected off the first reflection surface 42 is incident on the first light exiting surface 43 in the first optical element 33, is greater than the second angle of incidence, at which the chief ray of the second light flux reflected off the second reflection surface 47 is incident on the second light exiting surface 48 in the second optical element 34.

The second pupil P2 of the second optical system 32 is located inside the second optical element 34, as shown in FIG. 17. The second pupil P2 of the second optical system 32 in the plane YZ is defined by the line that connects the upper intersection 53, where the upper peripheral light ray 51a of the upper end light flux 51 passing through the axis-Y-direction upper end of the effective light ray range 50 of the second light exiting surface 48 and the upper peripheral light ray 52a of the lower end light flux 52 passing through the axis-Y-direction lower end of the effective light ray range 50 intersect each other in the plane YZ, to the lower intersection 54, where the lower peripheral light ray 51b of the upper end light flux 51 and the lower peripheral light ray 52b of the lower end light flux 52 intersect each other in the plane YZ. The second pupil P2 inclines with respect to the imaginary vertical line V perpendicular to the second optical axis M of the second reflection surface 47 in the plane YZ.

Lens Data

In the projection system 3B in the second form, the second distance, which is the axial inter-surface distance between the lens L14 of the first optical system 31 and the second optical element 34, differs from the first distance, which is the axial inter-surface distance between the lens L14 of the first optical system 31 and the first optical element 33 in the projection system 3B in the first form. That is, in the projection system 3B according to the present example, the placement mechanism 60 places the first optical element 33 and the second optical element 34 in different positions on the first optical axis N of the first optical system 31. In the projection system 3B in the second form, the lens L14, which is a first lens located in a position closest to the enlargement side in the first optical system 31, and the lens L13, which is a second lens located on the reduction side of the lens L14, are moved along the first optical axis N of the first optical system 31 for focusing. That is, in the projection system 3B according to the present example, the distance between the lens L14 and the lens L13 when the second optical element 34 is placed to the second optical system 32 differs from the distance between the lens L14 and the lens L13 when the first optical element 33 is placed to the second optical system 32. Data on the lenses of the projection system 3B in the second form are listed below. The surfaces of the lenses are numbered sequentially from the reduction side toward the enlargement side. Reference characters are given to the lenses, the second light incident surface, the second reflection surface, and the second light exiting surface. Data labeled with a surface number that does not correspond to any of the lenses, the second light incident surface, the second reflection surface, and the second light exiting surface is dummy data. Reference character R denotes the radius of curvature. Reference character D denotes the axial inter-surface distance. Reference character C denotes the aperture radius. Reference characters R, D, and C are each expressed in millimeters.

| Reference character | Surface number | Shape | R | D | Glass material | Refraction/reflection | C |
|---|---|---|---|---|---|---|---|
| 18 | 0 | Spherical | Infinity | 8.4859 | | Refraction | 0.0000 |
| 19 | 1 | Spherical | Infinity | 30.1506 | SBSL7_OHARA | Refraction | 13.0791 |
| | 2 | Spherical | Infinity | 5.0143 | | Refraction | 16.2353 |
| | 3 | Spherical | Infinity | 0.0000 | | Refraction | 17.0378 |
| | 4 | Spherical | Infinity | 0.0000 | | Refraction | 17.0378 |
| | 5 | Spherical | Infinity | 0.0000 | | Refraction | 17.0378 |
| L1 | 6 | Spherical | 208.6545 | 5.2079 | 846663.2378 | Refraction | 17.1508 |
| | 7 | Spherical | −50.8988 | 0.1000 | | Refraction | 17.2211 |
| L2 | 8 | Spherical | 36.8543 | 14.2150 | 454294.8218 | Refraction | 15.6673 |
| L3 | 9 | Spherical | −22.5903 | 1.0000 | 843402.2598 | Refraction | 13.8362 |
| | 10 | Spherical | 236.0866 | 0.1390 | | Refraction | 13.5990 |
| L4 | 11 | Spherical | 33.8621 | 11.1910 | 459927.8531 | Refraction | 13.5407 |
| L5 | 12 | Spherical | −25.9849 | 2.8206 | 845715.2419 | Refraction | 12.7904 |
| | 13 | Spherical | 36.1675 | 5.2726 | | Refraction | 12.8547 |
| L6 | 14 | Spherical | 86.7155 | 5.7825 | 845955.238 | Refraction | 14.4698 |
| | 15 | Spherical | −36.4831 | 0.1000 | | Refraction | 14.6412 |
| L7 | 16 | Spherical | −64.8378 | 3.7957 | 454002.8399 | Refraction | 14.3829 |
| | 17 | Spherical | −28.2734 | 17.7527 | | Refraction | 13.5002 |
| O | 18 | Spherical | Infinity | 2.5268 | | Refraction | 9.3221 |
| L8 | 19 | Spherical | −23.2500 | 2.1606 | 737187.5312 | Refraction | 10.5361 |
| | 20 | Spherical | −29.1624 | 6.0204 | | Refraction | 11.2691 |
| L9 | 21 | Spherical | 46.1866 | 13.7216 | 666888.3032 | Refraction | 13.5509 |
| L10 | 22 | Spherical | −15.4811 | 1.0000 | 845175.2515 | Refraction | 13.5566 |
| | 23 | Spherical | −45.4883 | 0.1000 | | Refraction | 14.5996 |

-continued

| Reference character | Surface number | Shape | R | D | Glass material | Refraction/ reflection | C |
|---|---|---|---|---|---|---|---|
| L11 | 24 | Spherical | −46.5394 | 5.1285 | 437001.951 | Refraction | 14.6009 |
| | 25 | Spherical | −21.2061 | 0.2919 | | Refraction | 14.7583 |
| L12 | 26 | Spherical | −29.2680 | 16.4379 | 834702.4273 | Refraction | 13.8241 |
| | 27 | Spherical | 51.7480 | 0.1000 | | Refraction | 15.7392 |
| L13 | 28 | Aspheric | 32.1031 | 6.0001 | E48R_ZEON | Refraction | 20.7662 |
| | 29 | Aspheric | 60.7245 | 16.9807 | | Refraction | 20.7662 |
| L14 | 30 | Aspheric | −228.1519 | 6.0001 | E48R_ZEON | Refraction | 22.0626 |
| | 31 | Aspheric | −1,050.9549 | 0.1000 | | Refraction | 23.5701 |
| | 32 | Spherical | Infinity | 0.0000 | | Refraction | 22.4862 |
| 46 | 33 | Aspheric | 30.7020 | 39.2342 | Z330R_ZEON | Refraction | 22.0519 |
| | 34 | Spherical | Infinity | 0.0000 | Z330R_ZEON | Refraction | 18.5297 |
| 47 | 35 | Aspheric | −21.7497 | 0.0000 | Z330R_ZEON | Reflection | 18.7876 |
| | 36 | Spherical | Infinity | −39.2342 | Z330R_ZEON | Refraction | 33.9454 |
| 48 | 37 | Aspheric | 30.7020 | −110.0018 | | Refraction | 33.4079 |
| | 38 | Spherical | Infinity | −95.0015 | | Refraction | 518.8422 |
| | 39 | Spherical | Infinity | −301.0048 | | Refraction | 877.1733 |
| S | 40 | Spherical | Infinity | 0.0000 | | Refraction | 2012.5172 |

The aspheric coefficients of each of the aspheric surfaces of the second optical element 34 are listed below.

| Surface number | S33 | S35 | S37 |
|---|---|---|---|
| Radius of curvature in axis-Y direction | 30.7020 | −21.7497 | 30.7020 |
| Conic constant (k) | 0.173779984 | −1.706904246 | 0.173779984 |
| Fourth-order coefficient (A) | −7.93334E−07 | 5.52070E−06 | −7.93334E−07 |
| Sixth-order coefficient (B) | −3.68186E−08 | 9.66595E−0 9 | −3.68186E−08 |
| Eighth-order coefficient (C) | 9.63890E−11 | −2.00040E−11 | 9.63890E−11 |
| Tenth-order coefficient (D) | −9.94669E−14 | 2.37406E−14 | −9.94669E−14 |
| Twelfth-order coefficient (E) | 3.65376E−17 | | 3.65376E−17 |

The maximum object height, the F number, the projection angle, and TR of the projection system 3B in the second form are as follows: The maximum object height is the dimension from the first optical axis N of the projection system 3B in the second form to the farthest point therefrom in the image formation region of the surface of each of the liquid crystal panels 18. The maximum object height is expressed in millimeters. The F number is abbreviated to FNO. The projection angle is the second projection angle θ2 in degrees. TR stands for the throw ratio and is the quotient of the operation of dividing the projection distance by the axis-X-direction dimension of a projection image projected on the screen S.

| Maximum object height | 11.7 |
|---|---|
| FNO | 1.880 |
| Projection angle | 64.5 |
| TR (0.59" 16:9LV) | 0.419 |

Effects and Advantages

The present example can also provide the same effects and advantages as those provided by the projection system according to Example 1.

Figure 19:
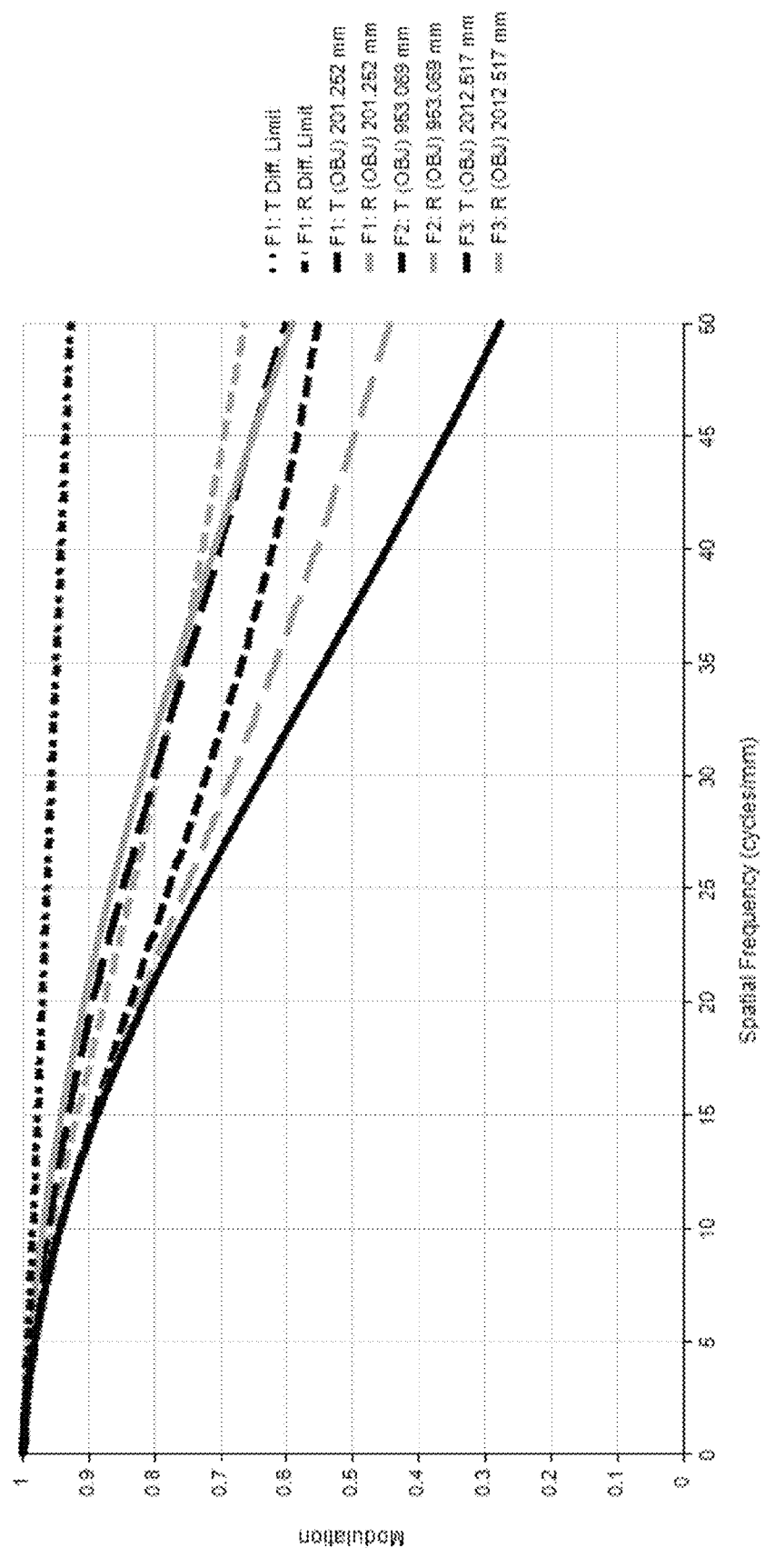
FIG. 19 shows the enlargement-side MTF of the projection system in the first form according to Example 2.
Figure 20:
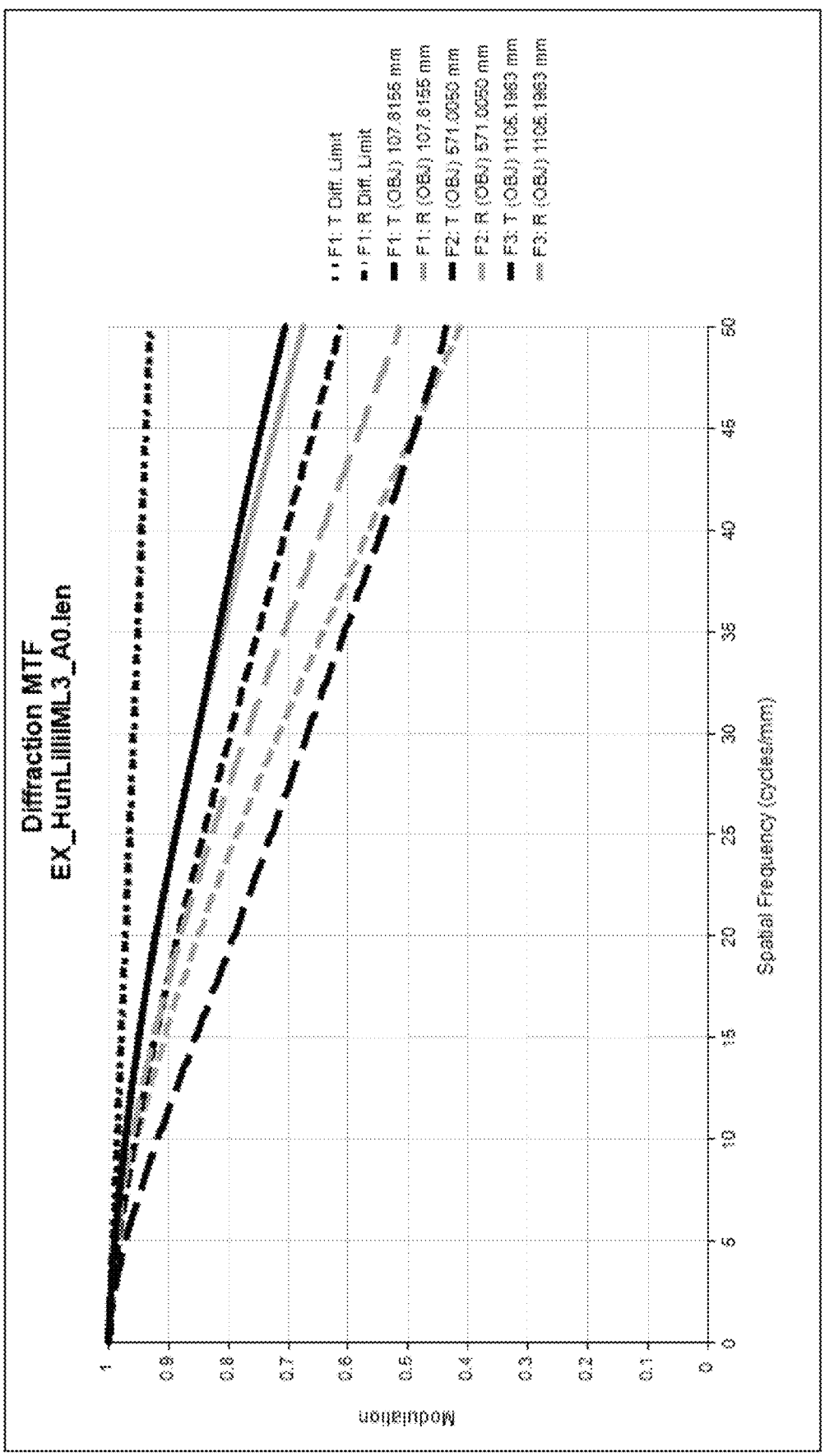
FIG. 20 shows the enlargement-side MTF of the projection system in the second form according to Example 2.

FIG. 19 shows the enlargement-side MTF of the projection system 3B in the first form. FIG. 20 shows the enlargement-side MTF of the projection system 3B in the second form. In FIGS. 19 and 20, the horizontal axis represents the spatial frequency, and the vertical axis represents the contrast reproduction ratio. The projection system 3B according to the present example provides high resolution, as shown in FIGS. 19 and 20.

Example 3

Figure 21:
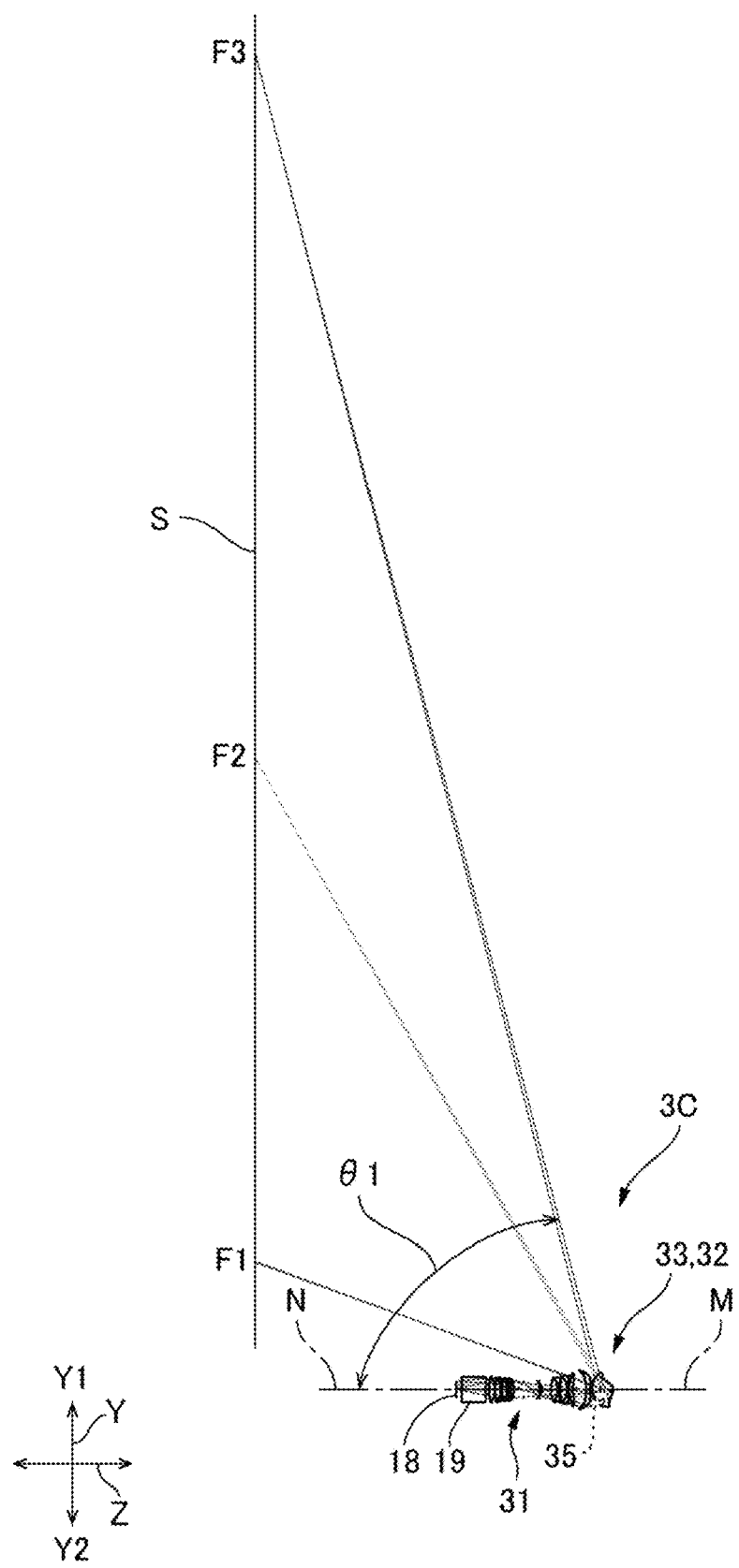
FIG. 21 is a light ray diagram diagrammatically showing the entire projection system in the first form according to Example 3.
Figure 22:
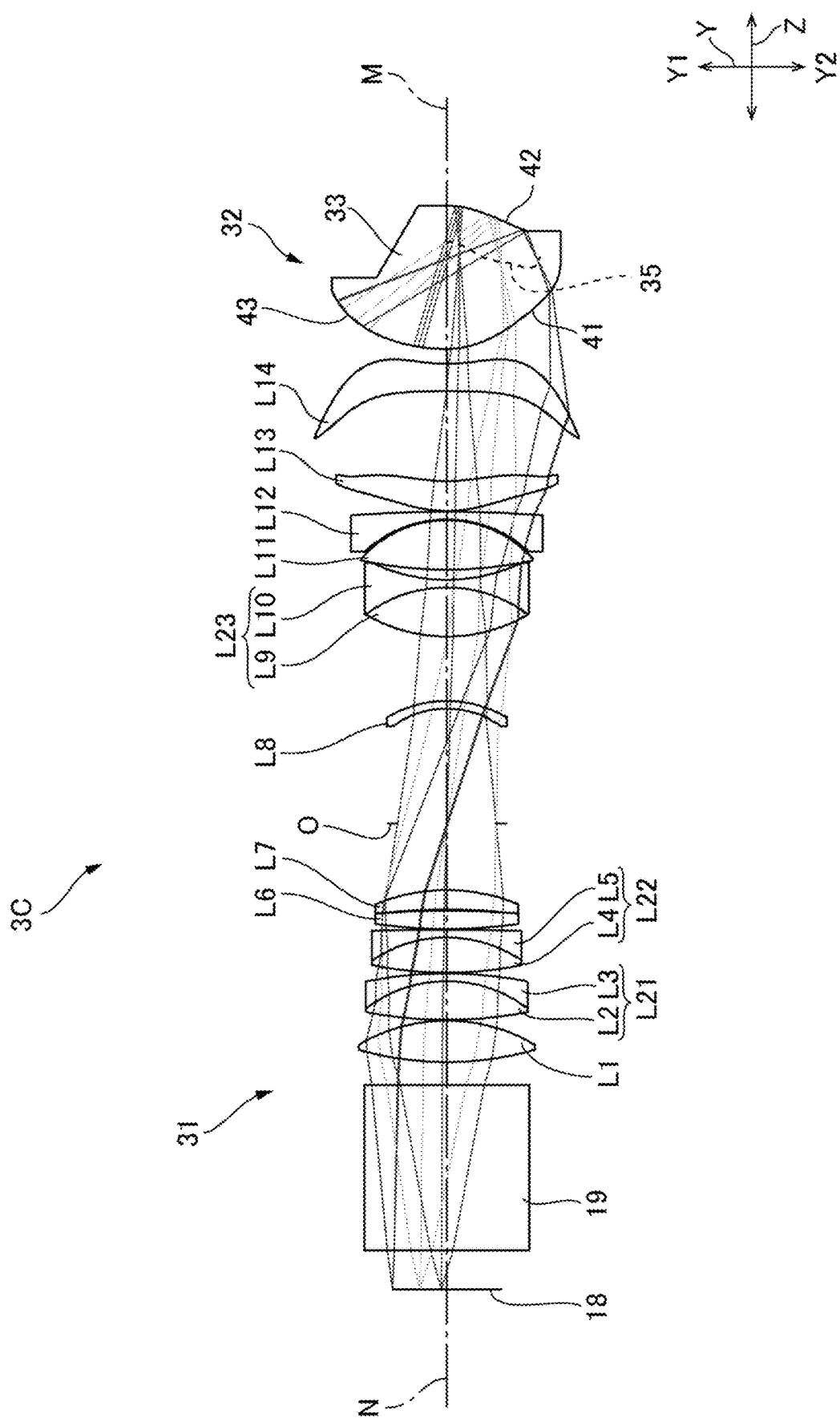
FIG. 22 is a light ray diagram of the first form of the projection system according to Example 3.
Figure 23:
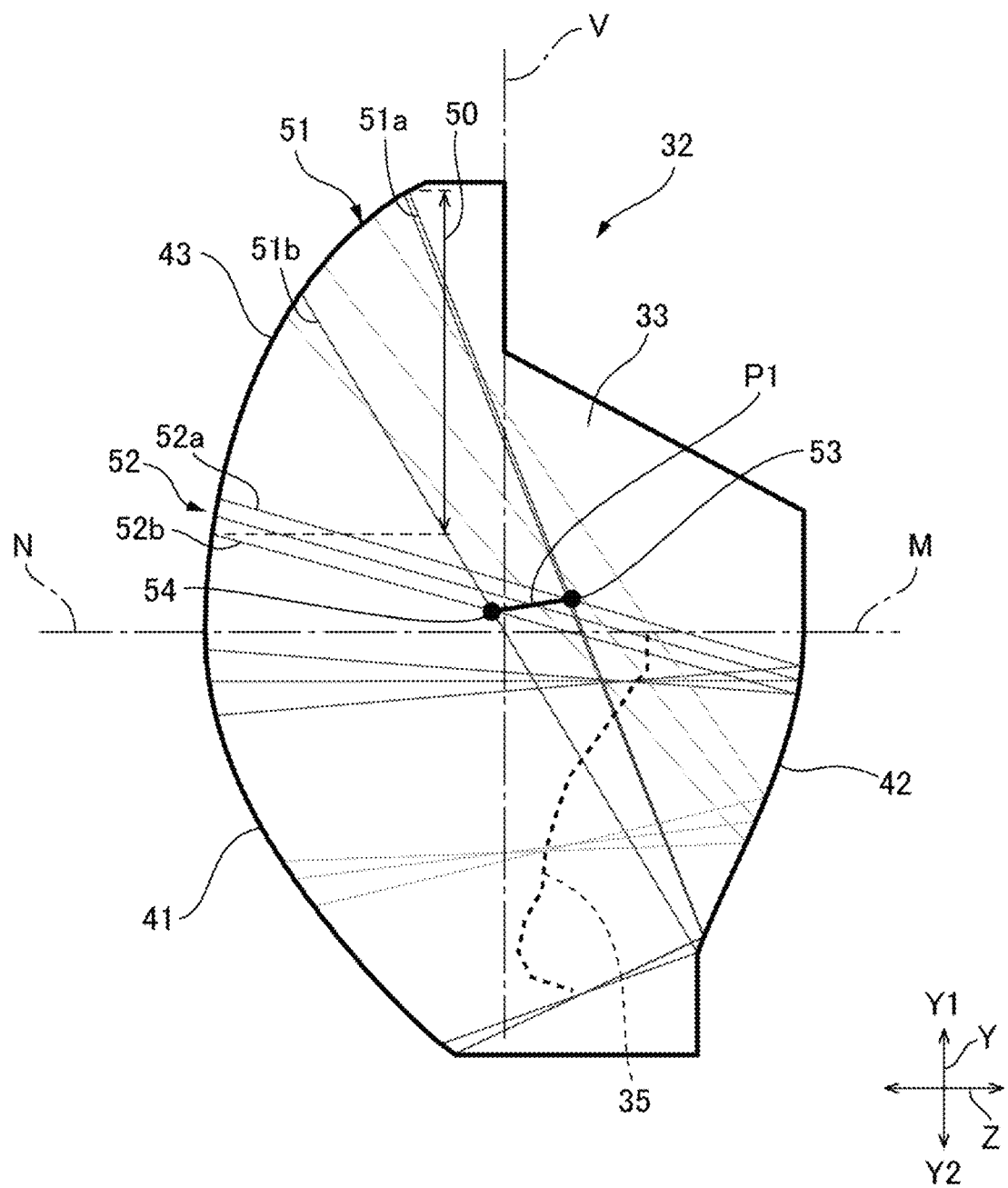
FIG. 23 is a light ray diagram of the second optical system in the first form of the projection system according to Example 3.
Figure 24:
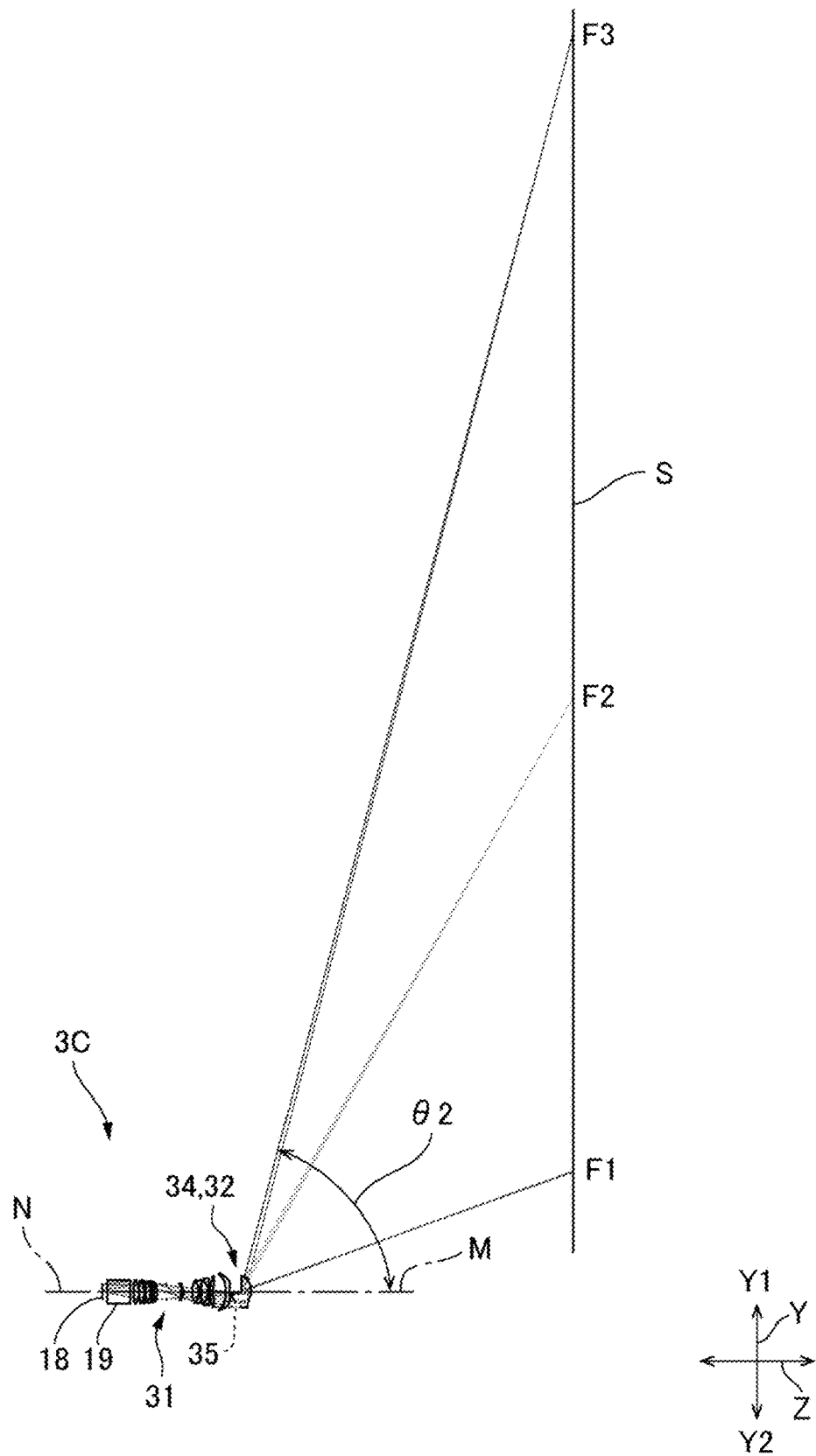
FIG. 24 is a light ray diagram diagrammatically showing the entire projection system in the second form according to Example 3.
Figure 25:
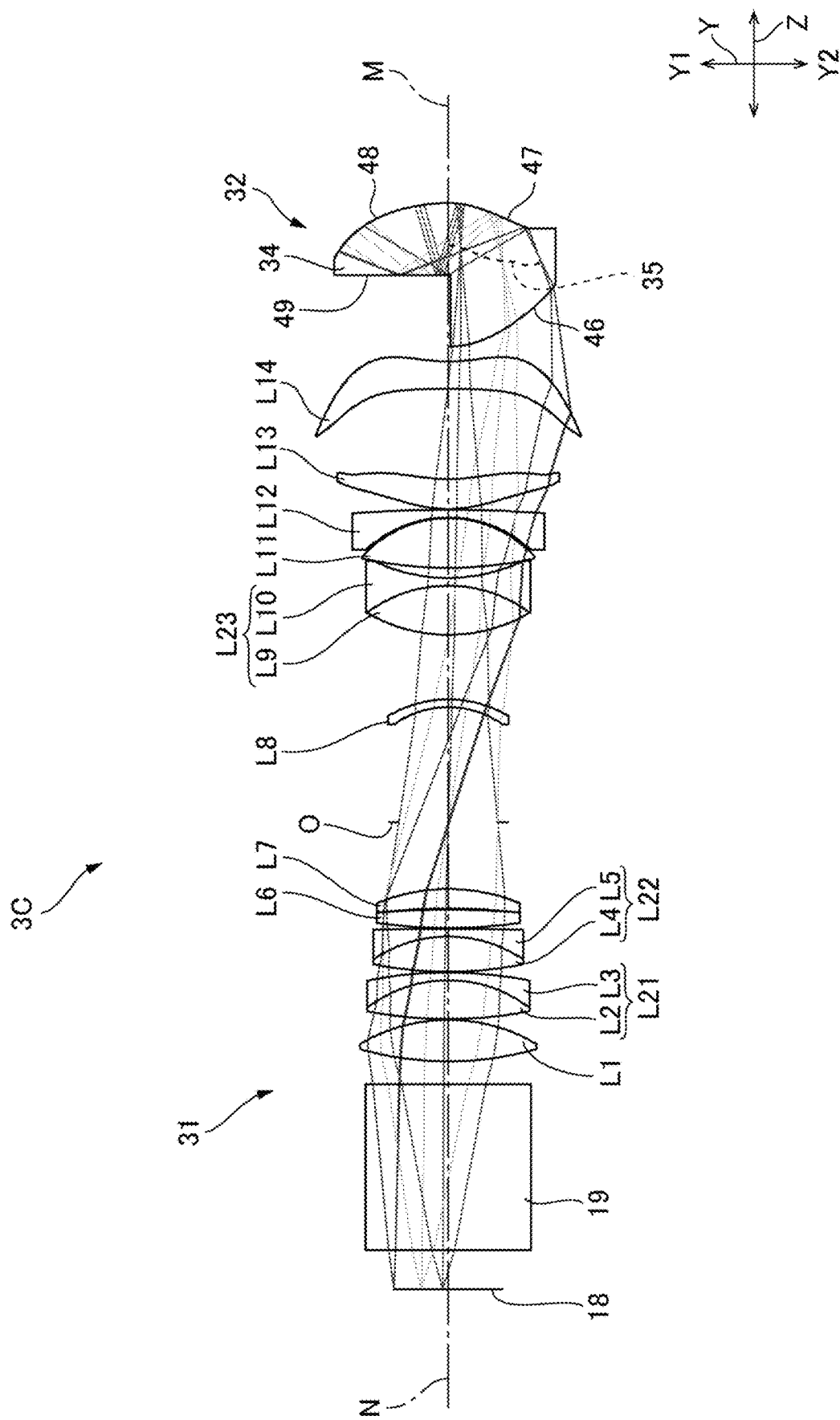
FIG. 25 is a light ray diagram of the second form of the projection system according to Example 3.
Figure 26:
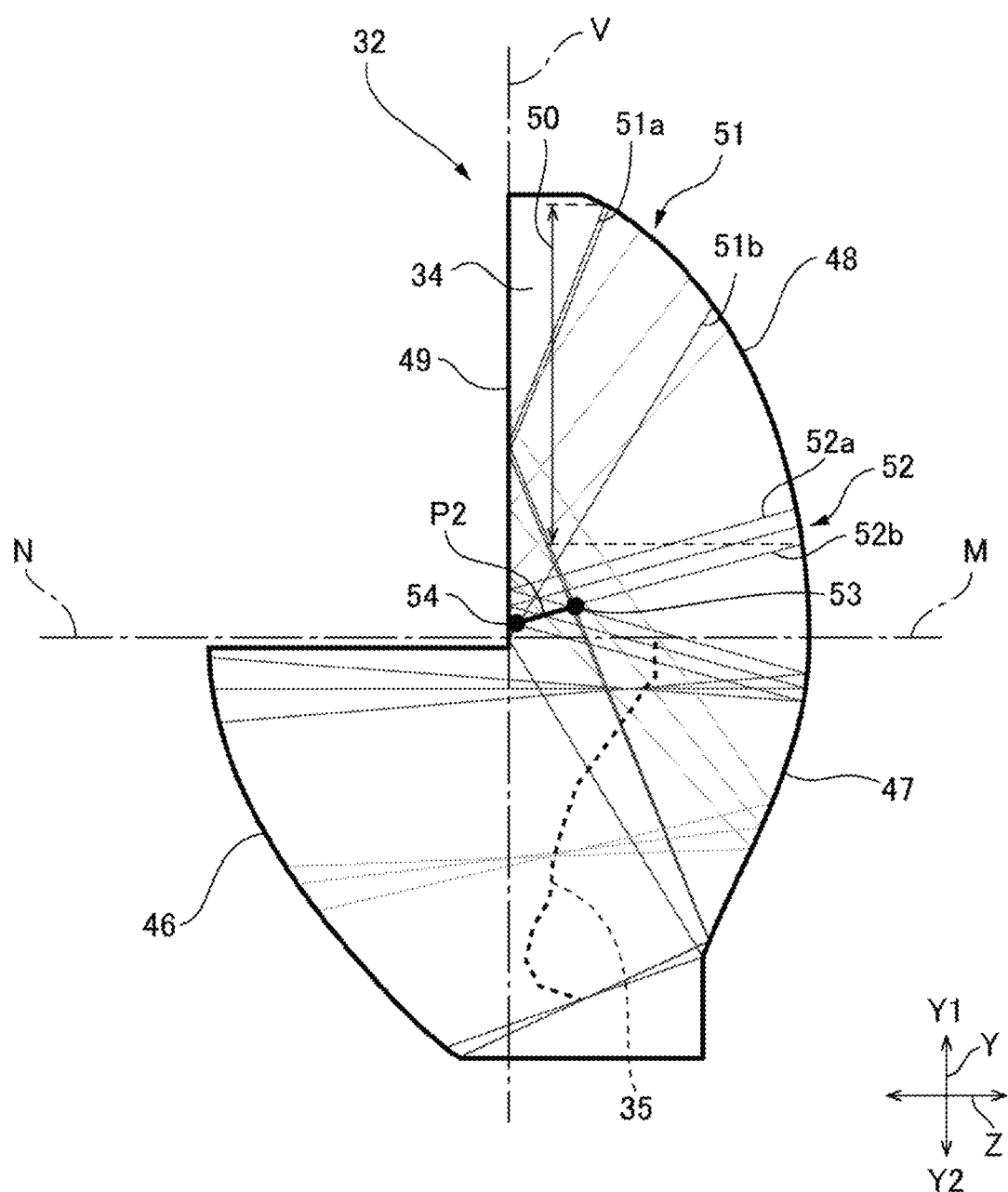
FIG. 26 is a light ray diagram of the second optical system in the second form of the projection system according to Example 3.

FIG. 21 is a light ray diagram diagrammatically showing the entirety of a projection system 3C in the first form according to Example 3. FIG. 22 is a light ray diagram of the first form of the projection system 3C according to Example 3. FIG. 23 is a light ray diagram of the second optical system in the first form of the projection system 3C according to Example 3. FIG. 24 is a light ray diagram diagrammatically showing the entirety of the projection system 3C in the second form according to Example 3. FIG. 25 is a light ray diagram of the projection system 3C in the second form according to Example 3. FIG. 26 is a light ray diagram of the second optical system in the second form of the projection system 3C according to Example 3.

The projection system 3C in the first form can perform wide-angle projection, as shown in FIG. 21. That is, the first projection angle θ1, which is the projection angle over which the projection system 3C in the first form projects the final image on the screen S, is relatively large. FIGS. 21 and 24 diagrammatically show the light fluxes F1 to F3, which exit out of the projection system 3C according to the present example and reach the screen S. The light flux F1 is a light flux that reaches a smallest image height position. The light flux F3 is a light flux that reaches a largest image height position. The light flux F2 is a light flux that reaches a position between the position that the light flux F1 reaches and the position that the light flux F3 reaches. The projection angle used herein is the angle between the first optical axis N of the first optical system 31 and the outermost light ray of the light flux F3.

First Form of Example 3

The projection system 3C in the first form includes the first optical system 31 and the second optical system 32 sequentially arranged from the reduction side toward the enlargement side, as shown in FIG. 21. The first optical system 31 is a refractive optical system including a plurality of lenses. The second optical system 32 is formed of the first optical element 33. The first optical element 33 has the first light incident surface 41, the first reflection surface 42, and the first light exiting surface 43 sequentially arranged from the reduction side. The first light incident surface 41 has a convex shape protruding toward the reduction side. The first reflection surface 42 has a concave shape. The first light exiting surface 43 has a convex shape protruding toward the enlargement side. The first optical element 33, which forms the second optical system 32, is disposed on the first optical axis N of the first optical system 31. In the present example, the first optical axis N of the first optical system 31 coincides with the second optical axis M of the first reflection surface 42.

The liquid crystal panels 18 of the image formation section 2 are disposed in the reduction-side image formation plane of the projection system 3C. The liquid crystal panels 18 form the projection images on one side of the first optical axis N of the first optical system 31 in a plane perpendicular to the first optical axis N. The screen S is disposed in the enlargement-side image formation plane of the projection system 3C. The intermediate image 35 conjugate with the reduction-side image formation plane is formed between the first optical system 31 and the first reflection surface 42 of the first optical element 33. The intermediate image 35 is conjugate also with the enlargement-side image formation plane. In the present example, the intermediate image 35 is formed inside the first optical element 33. That is, the intermediate image 35 is formed between the first light incident surface 41 and the first reflection surface 42 of the first optical element 33.

In the present example, the first optical axis N of the first optical system 31 and the second optical axis M of the first reflection surface 42 of the first optical element 33 extend in the axis-Z direction. FIGS. 21, 22, and 23 are each a light ray diagram in the plane YZ. The liquid crystal panels 18 form the projection images on the upper side Y1 of the first optical axis N of the first optical system 31.

The first optical system 31 includes the cross dichroic prism 19 and 14 lenses L1 to L14, as shown in FIG. 21. The lenses L1 to L14 are arranged in the presented order from the reduction side toward the enlargement side. In the present example, the lenses L2 and L3 are bonded to each other into the first doublet L21. The lenses L4 and L5 are bonded to each other into the second doublet L22. The lenses L9 and L10 are bonded to each other into the third doublet L23. The aperture O is disposed between the lens L7 and the lens L8.

The first optical element 33 is designed by using the second optical axis M of the first reflection surface 42 as the axis in the design stage, as shown in FIG. 23. In other words, the second optical axis M is the design-stage optical axis of the first light incident surface 41, the first light exiting surface 43, and the first reflection surface 42. The first light incident surface 41 and the first reflection surface 42 are located on the lower side Y2 of the second optical axis M of the first reflection surface 42, and the first light exiting surface 43 is located on the upper side Y1 of the second optical axis M of the first reflection surface 42. The first light incident surface 41, the first reflection surface 42, and the first light exiting surface 43 of the first optical element 33 are each an aspheric surface. The first reflection surface 42 is a reflection coating layer provided on a surface of the first optical element 33 that is the surface opposite the first light incident surface 41. The aspheric surfaces are each a free-form surface in some cases. Also in this case, the free-form surfaces are designed by using the second optical axis M as the design-stage axis.

The first pupil P1 of the second optical system 32 is located inside the first optical element 33, as shown in FIG. 23. The first pupil P1 of the second optical system 32 in the plane YZ is defined by the line that connects the upper intersection 53, where the upper peripheral light ray 51a of the upper end light flux 51 passing through the axis-Y-direction upper end of the effective light ray range of the first light exiting surface 43 and the upper peripheral light ray 52a of the lower end light flux 52 passing through the axis-Y-direction lower end of the effective light ray range 50 intersect each other in the plane YZ, to the lower intersection 54, where the lower peripheral light ray 51b of the upper end light flux 51 and the lower peripheral light ray 52b of the lower end light flux 52 intersect each other in the plane YZ. The first pupil P1 inclines with respect to the imaginary vertical line V perpendicular to the second optical axis M of the first reflection surface 42 in the plane YZ.

Lens Data

Data on the lenses of the projection system 3C are listed below. The surfaces of the lenses are numbered sequentially from the reduction side toward the enlargement side. Reference characters are given to the lenses, the first light incident surface, the first reflection surface, and the first light exiting surface. Data labeled with a surface number that does not correspond to any of the lenses, the first light incident surface, the first reflection surface, and the first light exiting surface is dummy data. Reference character R denotes the radius of curvature. Reference character D denotes the axial inter-surface distance. Reference character C denotes the aperture radius. Reference characters R, D, and C are each expressed in millimeters.

| Reference character | Surface number | Shape | R | D | Glass material | Refraction/reflection | C |
|---|---|---|---|---|---|---|---|
| 18 | 0 | Spherical | Infinity | 5.0771 | | Refraction | 0.0000 |
| 19 | 1 | Spherical | Infinity | 21.5089 | SBSL7_OHARA | Refraction | 8.2832 |
| | 2 | Spherical | Infinity | 3.0000 | | Refraction | 11.8012 |
| | 3 | Spherical | Infinity | 0.0000 | | Refraction | 12.5595 |
| | 4 | Spherical | Infinity | 0.0000 | | Refraction | 12.5595 |
| | 5 | Spherical | Infinity | 0.0000 | | Refraction | 12.5595 |
| L1 | 6 | Spherical | 41.7981 | 5.3869 | 454494.8186 | Refraction | 13.0910 |
| | 7 | Spherical | −22.2835 | 0.1000 | | Refraction | 13.0364 |
| L2 | 8 | Spherical | 54.2754 | 5.0410 | 451333.7958 | Refraction | 11.4965 |
| L3 | 9 | Spherical | −17.1845 | 1.0000 | 836974.3715 | Refraction | 11.7006 |
| | 10 | Spherical | −52.9270 | 0.1000 | | Refraction | 11.7951 |
| L4 | 11 | Spherical | 47.9808 | 4.5785 | 449429.8119 | Refraction | 11.3586 |
| L5 | 12 | Spherical | −17.2585 | 1.0000 | 836389.3853 | Refraction | 11.5883 |
| | 13 | Spherical | −421.1997 | 0.1070 | | Refraction | 11.9083 |

-continued

| Reference character | Surface number | Shape | R | D | Glass material | Refraction/reflection | C |
|---|---|---|---|---|---|---|---|
| L6 | 14 | Spherical | 63.7304 | 2.3863 | 846663.2378 | Refraction | 8.4268 |
|  | 15 | Spherical | −108.4486 | 0.1539 |  | Refraction | 12.0087 |
| L7 | 16 | Spherical | −74.2437 | 2.5285 | 445852.8468 | Refraction | 12.0373 |
|  | 17 | Spherical | −24.0570 | 8.6940 |  | Refraction | 12.0172 |
| O | 18 | Spherical | Infinity | 14.8700 |  | Refraction | 6.4426 |
| L8 | 19 | Spherical | −12.0396 | 1.0000 | 754999.5232 | Refraction | 8.1861 |
|  | 20 | Spherical | −15.1143 | 8.3927 |  | Refraction | 8.8321 |
| L9 | 21 | Spherical | 20.7081 | 6.3849 | 632937.3259 | Refraction | 9.0259 |
| L10 | 22 | Spherical | −17.4743 | 1.0000 | 846630.2381 | Refraction | 15.7341 |
|  | 23 | Spherical | 22.2176 | 1.3175 |  | Refraction | 11.5123 |
| L11 | 24 | Spherical | 51.7320 | 6.4418 | 705847.283 | Refraction | 10.8155 |
|  | 25 | Spherical | −14.8667 | 0.1000 |  | Refraction | 10.9572 |
| L12 | 26 | Spherical | −15.5940 | 1.0000 | 754950.5233 | Refraction | 10.8132 |
|  | 27 | Spherical | −164.6925 | 0.1000 |  | Refraction | 12.1253 |
| L13 | 28 | Aspheric | 15.7262 | 3.8897 | E48R_ZEON | Refraction | 13.7886 |
|  | 29 | Aspheric | 21.7673 | 11.6983 |  | Refraction | 13.8868 |
| L14 | 30 | Aspheric | −162.8890 | 3.5584 | E48R_ZEON | Refraction | 15.7563 |
|  | 31 | Aspheric | 19.2386 | 1.9369 |  | Refraction | 16.3064 |
|  | 32 | Spherical | Infinity | 0.0000 |  | Refraction | 14.8181 |
| 41 | 33 | Aspheric | 11.4271 | 18.6477 | Z330R_ZEON | Refraction | 13.7195 |
|  | 34 | Spherical | Infinity | 0.0000 | Z330R_ZEON | Refraction | 9.6146 |
| 42 | 35 | Aspheric | −10.9153 | 0.0000 | Z330R_ZEON | Reflection | 10.7700 |
|  | 36 | Spherical | Infinity | −9.3261 | Z330R_ZEON | Refraction | 18.0333 |
|  | 37 | Spherical | Infinity | 0.0000 | Z330R_ZEON | Refraction | 16.5347 |
|  | 38 | Spherical | Infinity | −9.3261 | Z330R_ZEON | Refraction | 16.5347 |
| 43 | 39 | Aspheric | 22.7753 | −65.8130 |  | Refraction | 15.5849 |
|  | 40 | Spherical | Infinity | −56.8385 |  | Refraction | 285.0512 |
|  | 41 | Spherical | Infinity | −180.0883 |  | Refraction | 498.4798 |
| S | 42 | Spherical | Infinity | 0.0000 |  | Refraction | 1169.4561 |

The aspheric coefficients of each of the aspheric surfaces are listed below.

| Surface number | S28 | S29 | S30 | S31 |
|---|---|---|---|---|
| Radius of curvature in axis-Y direction | 15.7262 | 21.7673 | −162.8890 | 19.2386 |
| Conic constant (k) | −0.34070695 | −7.775047152 | 90 | 0 |
| Fourth-order coefficient (A) | −1.44445E−04 | −1.26419E−04 | −4.65331E−05 | −3.29684E−04 |
| Sixth-order coefficient (B) | 8.97377E−08 | 5.74077E−08 | −4.32930E−07 | 5.68427E−07 |
| Eighth-order coefficient (C) | 6.20294E−10 | 1.51258E−09 | 1.40636E−09 | −8.11882E−10 |
| Tenth-order coefficient (D) |  |  |  |  |
| Twelfth-order coefficient (E) |  |  |  |  |

| Surface number | S33 | S35 | S39 |
|---|---|---|---|
| Radius of curvature in axis-Y direction | 11.4271 | −10.9153 | 22.7753 |
| Conic constant (k) | −0.407326241 | −3.984142888 | 1.077443753 |
| Fourth-order coefficient (A) | −4.02438E−05 | −6.19674E−05 | −1.78454E−05 |
| Sixth-order coefficient (B) | −4.67907E−07 | 8.46203E−07 | 1.11659E−07 |
| Eighth-order coefficient (C) | 1.27376E−09 | −2.18754E−09 | 4.18094E−10 |
| Tenth-order coefficient (D) | −4.47766E−12 | 2.01334E−12 | −4.22966E−12 |

-continued

| Surface number | S33 | S35 | S39 |
|---|---|---|---|
| Twelfth-order coefficient (E) | −5.64150E−16 | | 9.89579E−15 |

The maximum object height, the numerical aperture, the projection angle, and TR of the projection system 3C in the first form are as follows: The maximum object height is the dimension from the first optical axis N of the projection system 3C in the first form to the farthest point therefrom in the image formation region of the surface of each of the liquid crystal panels 18. The maximum object height is expressed in millimeters. The numerical aperture is abbreviated to NA. The projection angle is the first projection angle θ1 in degrees. TR stands for the throw ratio and is the quotient of the operation of dividing the projection distance by the axis-X-direction dimension of a projection image projected on the screen S.

| Maximum object height | 7.0 |
|---|---|
| NA | 0.274 |
| Projection angle | 75.0 |
| TR (0.37" 16:9LV) | 0.221 |

Second Form of Example 3

The projection direction of the projection system 3C in the second form (second projection direction) differs from the projection direction of the projection system 3C in the first form (first projection direction), as shown in FIGS. 21 and 24. That is, the projection system 3C in the second form projects the light flux via the second optical system 32 toward the side opposite the first optical system 31. The second projection angle θ2, which is the projection angle over which the projection system 3C in the second form projects the final image on the screen S, is equal to the first projection angle θ1, over which the projection system. 3C in the first form projects the final image on the screen S.

The projection system 3C in the second form is formed of the first optical system 31 and the second optical system 32 sequentially arranged from the reduction side toward the enlargement side, as shown in FIG. 25. The second optical system 32 is formed of the second optical element 34. The second optical element 34 has the second light incident surface 46, the second reflection surface 47, a third reflection surface 49, and the second light exiting surface 48 sequentially arranged from the reduction side. That is, the second optical system 32 has the third reflection surface 49 on the optical path between the second reflection surface 47 and the second light exiting surface 48. The third reflection surface 49 is located between the second light incident surface 46 and the second reflection surface 47 in the direction along the second optical axis M of the second reflection surface 47. Further, the third reflection surface 49 is located between the second light incident surface 46 and the second light exiting surface 48 in the direction along the second optical axis M of the second reflection surface 47.

The second light incident surface 46 has a convex shape protruding toward the reduction side. The second reflection surface 47 has a concave shape. The third reflection surface 49 is a flat surface. That is, the third reflection surface 49 is a flat mirror. The second light exiting surface 48 has a convex shape protruding toward the enlargement side. The second optical element 34, which forms the second optical system 32, is disposed on the first optical axis N of the first optical system 31. In the present example, the first optical axis N of the first optical system 31 coincides with the second optical axis M of the second reflection surface 47. The first optical system 31 is the same as that of the projection system in the first form. The arrangement of the liquid crystal panels 18 is the same as that in the projection system in the first form.

The intermediate image 35 conjugate with the reduction-side image formation plane is formed between the first optical system 31 and the second reflection surface 47 of the second optical element 34. The intermediate image 35 is conjugate also with the enlargement-side image formation plane. The intermediate image 35 is formed inside the second optical element 34. That is, the intermediate image 35 is formed between the second light incident surface 46 and the second reflection surface 47 of the second optical element 34.

The second optical element 34 is designed by using the second optical axis M of the second reflection surface 47 as the axis in the design stage, as shown in FIG. 26. In other words, the second optical axis M is the design-stage optical axis of the second light incident surface 46, the second light exiting surface 48, and the second reflection surface 47. The second light incident surface 46 and the second reflection surface 47 are located on the lower side Y2 of the second optical axis M of the second reflection surface 47, and the third reflection surface 49 and the second light exiting surface 48 are located on the upper side Y1 of the second optical axis M of the second reflection surface 47. The second light incident surface 46, the second reflection surface 47, and the second light exiting surface 48 of the second optical element 34 are each an aspheric surface. The second reflection surface 47 is a reflection coating layer provided on a surface of the second optical element 34 that is the surface opposite the second light incident surface 46. The third reflection surface 49 is a reflection coating layer provided on a flat surface of the second optical element 34 that is the surface located on the side opposite the second light incident surface 46 with respect to the second optical axis M and facing the first optical system 31. The aspheric surfaces are each a free-form surface in some cases. Also in this case, the free-form surfaces are designed by using the second optical axis M as the design-stage axis.

The second pupil P2 of the second optical system 32 is located inside the second optical element 34, as shown in FIG. 26. The second pupil P2 of the second optical system 32 in the plane YZ is defined by the line that connects the upper intersection 53, where the upper peripheral light ray 51a of the upper end light flux 51 passing through the axis-Y-direction upper end of the effective light ray range 50 of the second light exiting surface 48 and the upper peripheral light ray 52a of the lower end light flux 52 passing through the axis-Y-direction lower end of the effective light ray range 50 intersect each other in the plane YZ, to the lower intersection 54, where the lower peripheral light ray 51b of the upper end light flux 51 and the lower peripheral light ray 52b of the lower end light flux 52 intersect each other in the plane YZ. The second pupil P2 inclines with respect to the imaginary vertical line V perpendicular to the second optical axis M of the second reflection surface 47 in the plane YZ.

Lens Data

Data on the lenses of the projection system 3C are listed below. The surfaces of the lenses are numbered sequentially from the reduction side toward the enlargement side. Reference characters are given to the lenses, the second light incident surface, the second reflection surface, the third reflection surface, and the second light exiting surface. Data labeled with a surface number that does not correspond to any of the lenses, the second light incident surface, the second reflection surface, the third reflection surface, and the second light exiting surface is dummy data. Reference character R denotes the radius of curvature. Reference character D denotes the axial inter-surface distance. Reference character C denotes the aperture radius. Reference characters R, D, and C are each expressed in millimeters.

| Reference character | Surface number | Shape | R | D | Glass material | Refraction/ reflection | C |
|---|---|---|---|---|---|---|---|
| 18 | 0 | Spherical | Infinity | 5.0771 | | Refraction | 0.0000 |
| 19 | 1 | Spherical | Infinity | 21.5089 | SBSL7_OHARA | Refraction | 8.2832 |
| | 2 | Spherical | Infinity | 3.0000 | | Refraction | 11.8012 |
| | 3 | Spherical | Infinity | 0.0000 | | Refraction | 12.5595 |
| | 4 | Spherical | Infinity | 0.0000 | | Refraction | 12.5595 |
| | 5 | Spherical | Infinity | 0.0000 | | Refraction | 12.5595 |
| L1 | 6 | Spherical | 41.7981 | 5.3869 | 454494.8186 | Refraction | 13.0910 |
| | 7 | Spherical | −22.2835 | 0.1000 | | Refraction | 13.0364 |
| L2 | 8 | Spherical | 54.2754 | 5.0410 | 451333.7958 | Refraction | 11.4965 |
| L3 | 9 | Spherical | −17.1845 | 1.0000 | 836974.3715 | Refraction | 11.7006 |
| | 10 | Spherical | −52.9270 | 0.1000 | | Refraction | 11.7951 |
| L4 | 11 | Spherical | 47.9808 | 4.5785 | 449429.8119 | Refraction | 11.3586 |
| L5 | 12 | Spherical | −17.2585 | 1.0000 | 836389.3853 | Refraction | 11.5883 |
| | 13 | Spherical | −421.1997 | 0.1070 | | Refraction | 11.9083 |
| L6 | 14 | Spherical | 63.7304 | 2.3863 | 846663.2378 | Refraction | 8.4268 |
| | 15 | Spherical | −108.4486 | 0.1539 | | Refraction | 12.0087 |
| L7 | 16 | Spherical | −74.2437 | 2.5285 | 445852.8468 | Refraction | 12.0373 |
| | 17 | Spherical | −24.0570 | 8.6940 | | Refraction | 12.0172 |
| O | 18 | Spherical | Infinity | 14.8700 | | Refraction | 6.4426 |
| L8 | 19 | Spherical | −12.0396 | 1.0000 | 754999.5232 | Refraction | 8.1861 |
| | 20 | Spherical | −15.1143 | 8.3927 | | Refraction | 8.8321 |
| L9 | 21 | Spherical | 20.7081 | 6.3849 | 632937.3259 | Refraction | 9.0259 |
| L10 | 22 | Spherical | −17.4743 | 1.0000 | 846630.2381 | Refraction | 15.7341 |
| | 23 | Spherical | 22.2176 | 1.3175 | | Refraction | 11.5123 |
| L11 | 24 | Spherical | 51.7320 | 6.4418 | 705847.283 | Refraction | 10.8155 |
| | 25 | Spherical | −14.8667 | 0.1000 | | Refraction | 10.9572 |
| L12 | 26 | Spherical | −15.5940 | 1.0000 | 754950.5233 | Refraction | 10.8132 |
| | 27 | Spherical | −164.6925 | 0.1000 | | Refraction | 12.1253 |
| L13 | 28 | Aspheric | 15.7262 | 3.8897 | E48R_ZEON | Refraction | 13.7886 |
| | 29 | Aspheric | 21.7673 | 11.6983 | | Refraction | 13.8868 |
| L14 | 30 | Aspheric | −162.8890 | 3.5584 | E48R_ZEON | Refraction | 15.7563 |
| | 31 | Aspheric | 19.2386 | 1.9369 | | Refraction | 16.3064 |
| | 32 | Spherical | Infinity | 0.0000 | | Refraction | 14.8181 |
| 41 | 33 | Aspheric | 11.4271 | 18.6477 | Z330R_ZEON | Refraction | 13.7195 |
| | 34 | Spherical | Infinity | 0.0000 | Z330R_ZEON | Refraction | 9.6146 |
| 42 | 35 | Aspheric | −10.9153 | 0.0000 | Z330R_ZEON | Reflection | 10.7700 |
| | 36 | Spherical | Infinity | −9.3261 | Z330R_ZEON | Refraction | 18.0333 |
| | 37 | Spherical | Infinity | 0.0000 | Z330R_ZEON | Reflection | 16.5347 |
| | 38 | Spherical | Infinity | 9.3261 | Z330R_ZEON | Refraction | 16.5347 |
| 43 | 39 | Aspheric | 22.7753 | 65.8130 | | Refraction | 15.5849 |
| | 40 | Spherical | Infinity | 56.8385 | | Refraction | 285.0512 |
| | 41 | Spherical | Infinity | 180.0883 | | Refraction | 498.4798 |

The aspheric coefficients of each of the aspheric surfaces of the second optical element 34 are listed below.

| Surface number | S33 | S35 | S39 |
|---|---|---|---|
| Radius of curvature in axis-Y direction | 11.4271 | −10.9153 | −22.7753 |
| Conic constant (k) | −0.407326241 | −3.984142888 | 1.077443753 |
| Fourth-order coefficient (A) | −4.02438E−05 | −6.19674E−05 | 1.78454E−05 |
| Sixth-order coefficient (B) | −4.67907E−07 | 8.46203E−07 | −1.11659E−07 |
| Eighth-order coefficient (C) | 1.27376E−09 | −2.18754E−09 | −4.18094E−10 |
| Tenth-order coefficient (D) | −4.47766E−12 | 2.01334E−12 | 4.22966E−12 |
| Twelfth-order coefficient (E) | −5.64150E−16 | | −9.89579E−15 |

The maximum object height, the numerical aperture, the projection angle, and TR of the projection system 3C in the second form are as follows: The maximum object height is the dimension from the first optical axis N of the projection system 3C in the second form to the farthest point therefrom in the image formation region of the surface of each of the liquid crystal panels 18. The maximum object height is expressed in millimeters. The numerical aperture is abbreviated to NA. The projection angle is the second projection angle θ2 in degrees. TR stands for the throw ratio and is the quotient of the operation of dividing the projection distance by the axis-X-direction dimension of a projection image projected on the screen S.

| Maximum object height | 7.0 |
|---|---|
| NA | 0.274 |
| Projection angle | 105.0 |
| TR (0.37" 16:9LV) | −0.221 |

Effects and Advantages

The projection system 3C according to the present example includes the first optical system 31 and the second optical system 32 sequentially arranged from the reduction side toward the enlargement side. The first optical element 33, which is selectively placed as the second optical system 32, has the first light incident surface 41, the first reflection surface 42, and the first light exiting surface 43 arranged from the reduction side, and the second optical element 34 has the second light incident surface 46, the second reflection surface 47, the third reflection surface 49, and the second light exiting surface 48 arranged from the reduction side.

Therefore, in the projection system 3C according to the present example, the light exiting surface can refract the light flux reflected off the reflection surface both when the first optical element 33 is selected as the second optical system 32 and the case where the second optical element 34 is selected as the second optical system 32. The projection distance of the projection system is therefore readily shortened as compared with the case where the second optical system has only the reflection surface. In other words, the projection system. 3C according to the present example can have a short focal length as compared with the case where the second optical system has only the reflection surface.

In the present example, when the first optical element 33 and the second optical element 34 are swapped, the angle between the screen S and the first optical axis N is unchanged, but the projection direction can be changed. That is, in the projection system 3C according to the present example, the second optical element 34 has the third reflection surface 49 on the optical path between the second reflection surface 47 and the second light exiting surface 48. The projection direction can therefore be changed when the first optical element 33 and the second optical element 34 are swapped in the projection system 3C according to the present example.

Further, in the present example, the first optical system 31 is commonly used both when the first optical element 33 is selected as the second optical system 32 and when the second optical element 34 is selected as the second optical system 32. That is, the single first optical system 31 is used. The cost required to change the projection direction can therefore be suppressed.

In the present example, in which the angle between the screen S and the first optical axis N is the same both in the first form and the second form. Except for this point, the present example can also provide the same effects as those provided by the projection systems described above.

Figure 27:
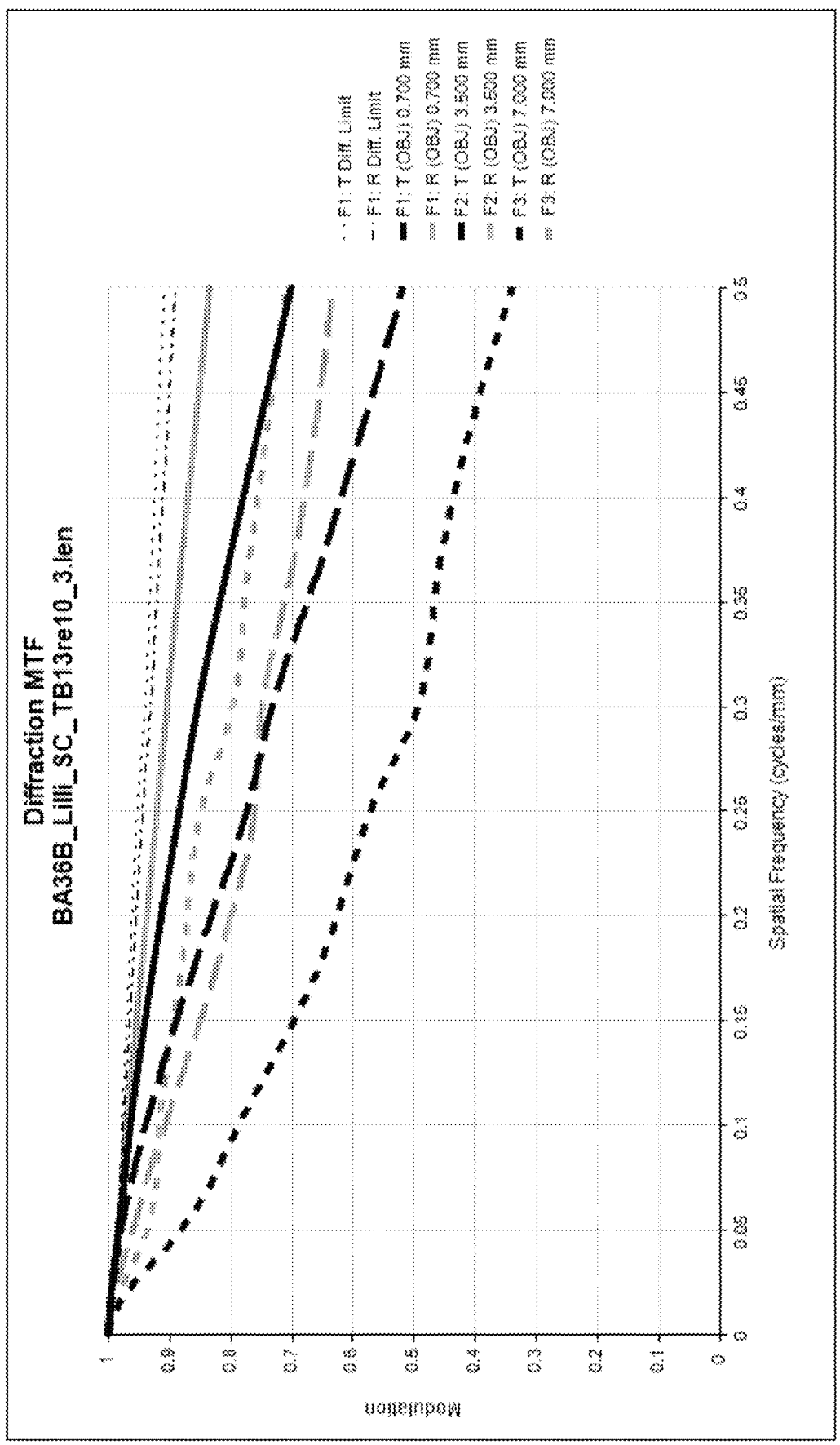
FIG. 27 shows the enlargement-side MTF of the projection system in the first form according to Example 3.
Figure 28:
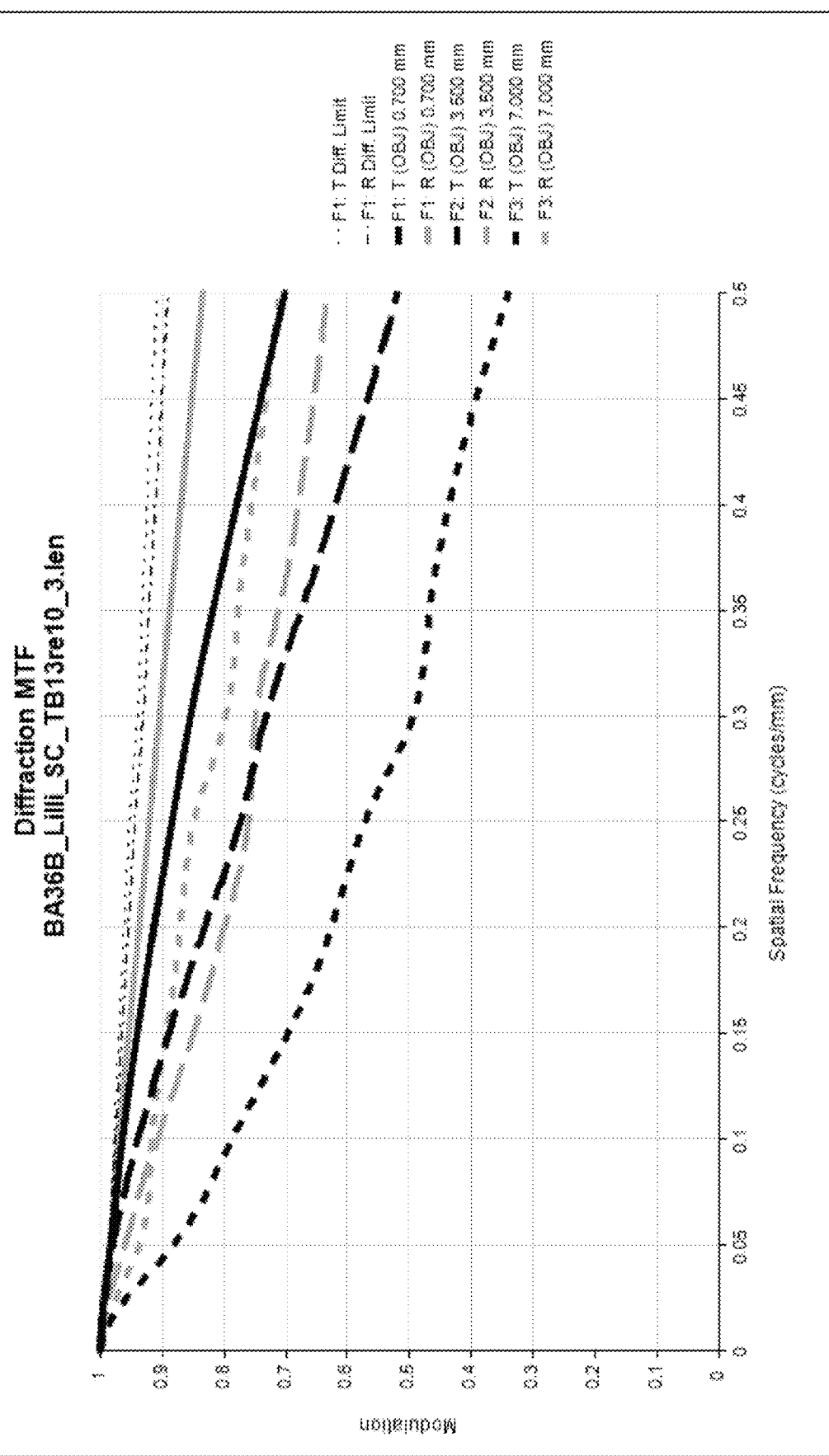
FIG. 28 shows the enlargement-side MTF of the projection system in the second form according to Example 3.

FIG. 27 shows the enlargement-side MTF of the projection system 3C in the first form. FIG. 28 shows the enlargement-side MTF of the projection system 3C in the second form. In FIGS. 27 and 28, the horizontal axis represents the spatial frequency, and the vertical axis represents the contrast reproduction ratio. The projection system 3C according to the present example provides high resolution, as shown in FIGS. 27 and 28.

In Examples 1 to 3 described above, the projection system 3 includes the placement mechanism 60 capable of selective placement of one of the first optical element 33 and the second optical element 34. The projection system 3 may instead include no placement mechanism 60. That is, the projection system 3 may include no placement mechanism 60 as long as the first optical element 33 and the second optical element 34 can be swapped.

What is claimed is:

1. A projection system comprising:
a first optical system;
a second optical system including a first optical element and a second optical element and disposed on an enlargement side of the first optical system; and
a placement mechanism configured to selectively place one of the first and second optical elements on a first optical axis of the first optical system,
wherein the first optical element has a first light incident surface, a first reflection surface disposed on the enlargement side of the first light incident surface, and a first light exiting surface disposed on the enlargement side of the first reflection surface, and
the second optical element has a second light incident surface, a second reflection surface disposed on the enlargement side of the second light incident surface, and a second light exiting surface disposed on the enlargement side of the second reflection surface.

2. The projection system according to claim 1,
wherein a first projection angle in a first arrangement in which the first optical element is placed to the second optical system differs a second projection angle in a second arrangement in which the second optical element is placed to the second optical system.

3. The projection system according to claim 1,
wherein the second optical element has a third reflection surface on an optical path of the second optical element between the second reflection surface and the second light exiting surface.

4. The projection system according to claim 3,
wherein a first projection direction of a light flux projected via the first light exiting surface in a first arrangement in which the first optical element is placed to the second optical system differs from a second projection direction of a light flux projected via the second light exiting surface in a second arrangement in which the second optical element is placed to the second optical system.

5. The projection system according to claim 4,
wherein the second projection direction is opposite the first projection direction in a direction along the first optical axis of the first optical system.

6. The projection system according to claim 1,
wherein the first optical system is commonly used both in a first arrangement in which the first optical element is placed to the second optical system and a second arrangement in which the second optical element is placed to the second optical system.

7. The projection system according to claim 1,
wherein the placement mechanism sets an axial inter-surface distance between the first optical system and the first optical element to be a first distance in a first arrangement in which the first optical element is placed to the second optical system, and an axial inter-surface distance between the first optical system and the second optical element to be a second distance different from the first distance in a second arrangement in which the second optical element is placed to the second optical system.

8. The projection system according to claim 1, wherein the first and second reflection surfaces have different shapes, the first and second light exiting surfaces have different shapes, and the first and second light incident surfaces have different shapes.

9. The projection system according to claim 1, wherein the first optical system includes a first lens disposed in a position closest to the enlargement side in the first optical system and a second lens disposed on a reduction side of the first les, and a distance between the first lens and the second lens in a first arrangement in which the first optical element is placed to the second optical system differs from the distance in a second arrangement in which the second optical element is placed to the second optical system.

10. The projection system according to claim 1, Wherein at least one of the first and second reflection surfaces has a concave shape.

11. The projection system according to claim 1, Wherein at least one of the first and second light exiting surfaces has a convex shape protruding toward the enlargement side.

12. The projection system according to claim 1, wherein the first and second light incident surfaces has a convex shape protruding toward a reduction side.

13. The projection system according to claim 1, wherein the first light incident surface and the first reflection surface are located on one side of an optical axis of the first reflection surface, and the first light exiting surface is located on other side of the optical axis of the first reflection surface.

14. The projection system according to claim 1, wherein the second light incident surface and the second reflection surface are located on one side of an optical axis of the second reflection surface, and the second light exiting surface is located on other side of the optical axis of the second reflection surface.

15. The projection system according to claim 1, Wherein at least one of the first reflection surface, the second reflection surface, the first light exiting surface, the second light exiting surface, the first light incident surface, and the second light incident surface is an aspheric surface.

16. The projection system according to claim 1, wherein the first light incident surface, the first reflection surface, and the first light exiting surface each have a shape rotationally symmetric around an optical axis of the first reflection surface.

17. The projection system according to claim 1, wherein the second light incident surface, the second reflection surface, and the second light exiting surface each have a shape rotationally symmetric around an optical axis of the second reflection surface.

18. The projection system according to claim 1, wherein a direction along an axis perpendicular to an optical axis of the first reflection surface is a first axial direction, a first pupil that connects an upper intersection to a lower intersection inclines with respect to an imaginary vertical line perpendicular to the optical axis of the first reflection surface in a plane containing the first optical axis of the first optical system and the optical axis of the first reflection surface, the upper intersection is an intersection where an upper peripheral light ray of an upper end light flux passing through an upper end of an effective light ray range of the first light exiting surface that is an upper end in the first axial direction and an upper peripheral light ray of a lower end light flux passing through a lower end of the effective light ray range that is a lower end in the first axial direction intersect each other in the plane, and the lower intersection is an intersection where a lower peripheral light ray of the upper end light flux and a lower peripheral light ray of the lower end light flux intersect each other in the plane.

19. The projection system according to claim 1, wherein a direction along an axis perpendicular to an optical axis of the second reflection surface is a first axial direction, a second pupil that connects an upper intersection to a lower intersection inclines with respect to an imaginary vertical line perpendicular to the optical axis of the second reflection surface in a plane containing the first optical axis of the first optical system and the optical axis of the second reflection surface, the upper intersection is an intersection where an upper peripheral light ray of an upper end light flux passing through an upper end of an effective light ray range of the second light exiting surface that is an upper end in the first axial direction and an upper peripheral light ray of a lower end light flux passing through a lower end of the effective light ray range that is a lower end in the first axial direction intersect each other in the plane, and the lower intersection is an intersection where a lower peripheral light ray of the upper end light flux and a lower peripheral light ray of the lower end light flux intersect each other in the plane.

20. The projection system according to claim 1, wherein an intermediate image is formed on a reduction side of the first reflection surface in a first arrangement in which the first optical element is placed to the second optical system, and an intermediate image is formed on the reduction side of the second reflection surface in a second arrangement in which the second optical element is placed to the second optical system.

21. A projector comprising:
the projection system according to claim 1; and
an image formation section that forms a projection image in a reduction-side image formation plane of the projection system.

* * * * *